US012293262B1

(12) United States Patent
Olgiati et al.

(10) Patent No.: US 12,293,262 B1
(45) Date of Patent: May 6, 2025

(54) ADAPTIVE MACHINE LEARNING TRAINING VIA IN-FLIGHT FEATURE MODIFICATION

(71) Applicant: Amazon Technologies, Inc., Seattle, WA (US)

(72) Inventors: Andrea Olgiati, Gilroy, CA (US); Hyunsu Cho, Menlo Park, CA (US); Rahul Iyer, Redwood City, CA (US); Laurence Louis Eric Rouesnel, New York, NY (US)

(73) Assignee: Amazon Technologies, Inc., Seattle, WA (US)

( * ) Notice: Subject to any disclaimer, the term of this patent is extended or adjusted under 35 U.S.C. 154(b) by 1197 days.

(21) Appl. No.: 16/585,266

(22) Filed: Sep. 27, 2019

(51) Int. Cl.
G06N 20/00 (2019.01)
G06F 16/16 (2019.01)

(52) U.S. Cl.
CPC ........... *G06N 20/00* (2019.01); *G06F 16/164* (2019.01)

(58) Field of Classification Search
CPC .............................. G06N 20/00; G06F 16/164
USPC ........................................................ 706/14
See application file for complete search history.

(56) References Cited

U.S. PATENT DOCUMENTS

| | | | | |
|---|---|---|---|---|
| 10,025,813 B1* | 7/2018 | Gebremariam | ........... | G06F 7/02 |
| 2002/0059521 A1* | 5/2002 | Tasler | ...................... | G07C 9/37 |
| | | | | 713/186 |
| 2007/0112716 A1* | 5/2007 | Sapir | ................... | G06F 18/2113 |
| | | | | 706/47 |
| 2008/0222646 A1* | 9/2008 | Sigal | ....................... | G06F 9/505 |
| | | | | 718/105 |
| 2012/0185851 A1* | 7/2012 | Zhang | .................. | G06F 9/5083 |
| | | | | 718/1 |
| 2012/0278060 A1* | 11/2012 | Cancedda | ............... | G06F 40/44 |
| | | | | 704/2 |
| 2014/0358828 A1* | 12/2014 | Phillipps | ................ | G06N 20/00 |
| | | | | 706/12 |
| 2015/0379423 A1* | 12/2015 | Dirac | ..................... | G06N 20/00 |
| | | | | 706/12 |
| 2016/0180737 A1* | 6/2016 | Clark | ...................... | G09B 5/02 |
| | | | | 434/236 |
| 2017/0032222 A1* | 2/2017 | Sharma | ................ | G06V 10/449 |
| 2018/0101893 A1* | 4/2018 | Dagan | ................ | G06Q 30/0641 |
| 2018/0113742 A1* | 4/2018 | Chung | .................. | G06F 9/4881 |
| 2020/0186520 A1* | 6/2020 | Oberheide | ........... | G06Q 20/356 |
| 2020/0372076 A1* | 11/2020 | Li | ........................ | G06F 11/3466 |
| 2021/0065680 A1* | 3/2021 | Audhkhasi | .............. | G10L 15/05 |
| 2021/0097431 A1* | 4/2021 | Olgiati | ................... | G06N 5/046 |

FOREIGN PATENT DOCUMENTS

WO WO-2018098230 A1 * 5/2018 ............. G06F 15/18

* cited by examiner

*Primary Examiner* — Amy Ng
*Assistant Examiner* — Abdullah A Daud
(74) *Attorney, Agent, or Firm* — Nicholson De Vos Webster & Elliott LLP

(57) ABSTRACT

Techniques for adaptive machine learning training via in-flight feature modification are described. A training monitor captures training data during the training of a machine learning model, and a metric generator creates metrics such as feature importance metrics based on the data. A rule evaluation engine determines whether any modification conditions are met for any of the features based on the metrics, and based on such a determination can cause the in-flight training job to be modified.

20 Claims, 10 Drawing Sheets

ADAPTIVE MACHINE LEARNING TRAINING VIA IN-FLIGHT FEATURE MODIFICATION

BACKGROUND

The field of machine learning has become widely accepted as a significant driver of the future of technology. Organizations everywhere now seek to use machine learning techniques to address a wide variety of problems, such as optimizing aspects of their products, internal processes, customer experience, etc. While the high-level view of machine learning sounds simple—e.g., provide training data to a computer, to allow the computer to automatically learn from the training data to generate a model that can make predictions for other data—implementing machine learning in practice can be tremendously difficult.

For example, many organizations are racing to implement ML solutions for their business problems, such as classification models for fraud detection and churn prediction, or regression models for risk assessment. However, building these solutions generally requires hiring experts in machine learning, who are in short supply and hard to retain. Due to a lack of deep training in math and statistics, most software engineers have a hard time developing good judgement on why one ML algorithm will work better than another, not to mention finding appropriate algorithm parameters. Beyond that, often times users need to clean up the data or preprocess it in order to build good models, and most users don't have the knowledge or ability to do that. Instead, typically users will use a dataset as it is, try one or two algorithms that are easy to use, and settle for whatever quality level they achieve—or give up entirely. As a result, organizations struggle with getting the desired model quality. Additionally, even for data scientists who have comprehensive ML knowledge, these scientists may need to spend huge amounts of their time experimenting with different ML solutions in order to find a best one for a particular problem.

These and other difficulties are partially due to the underlying algorithmic and mathematical complexities of machine learning algorithms, which are typically developed by academic researchers or individuals at the forefront of the field. Additionally, it is also difficult to generate, update, and deploy useful models, which can be extremely time and resource consumptive and filled with complexities. Moreover, machine learning models tend to be extremely focused on particular use cases and operating environments, and thus any change to the underlying environment or use case may require a complete regeneration of a new model. Further, constructing and deploying machine learning technologies is quite different from traditional software engineering, and requires practices and architectures different from what traditional software engineering development teams are familiar with.

BRIEF DESCRIPTION OF DRAWINGS

Various embodiments in accordance with the present disclosure will be described with reference to the drawings, in which.

DETAILED DESCRIPTION

The present disclosure relates to methods, apparatus, systems, and non-transitory computer-readable storage media for adaptive machine learning training via in-flight feature modification. Machine learning (ML) models may be trained to be able to produce inferences (or predictions) based on input data. Using techniques described herein, the training of a ML model may be monitored and modified, during the training, to adapt the use and/or importance of various features of the data used to train the model. Information such as per-feature metadata generated during a training over a window of time may be collected and written to storage. The information may be retrieved from storage and analyzed periodically (on a schedule) or on-demand, with minimal impact to the performance/progress of the training, and with minimal input or effort by users. Users may optionally configure the monitoring and/or modification with user-specified thresholds or goals, allowing the system to automatically determine whether and when to reduce the importance of features (or eliminate the use of features, when possible) during the training job. Using techniques described herein, the feature utilization and resultant quality of ML models can be automatically and efficiently adjusted during the training of these models.

As one skilled in the art will appreciate in light of this disclosure, embodiments may be capable of achieving certain technical advantages, including but not limited to efficiently reducing the feature utilization requirements of ML models within a single model training run, eliminating the need for multiple ML model training runs to adjust the feature reliance or utilization thereof, etc. Accordingly, embodiments may avoid the slow, wasteful, and resource-intensive ML model training approaches typically used that are reliant on completing a training job, analyzing the results, executing another modified training job, analyzing the results, and so on.

Figure 1:
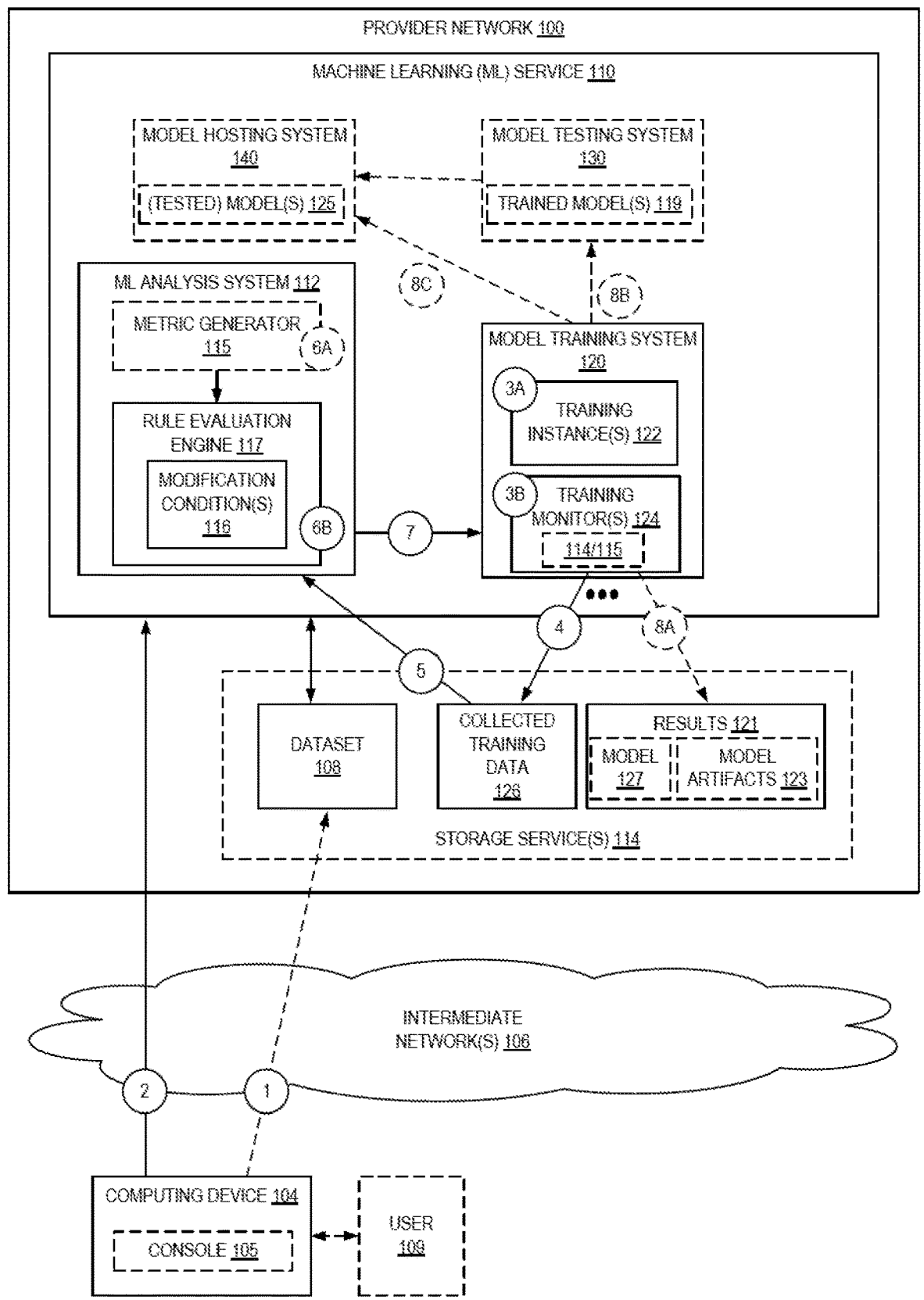
FIG. 1 is a diagram illustrating an environment for adaptive machine learning training via in-flight feature modification according to some embodiments.

FIG. 1 is a diagram illustrating an environment for adaptive machine learning training via in-flight feature modification according to some embodiments. This environment illustrates a machine learning (ML) service 110 provided by a provider network 100. The ML service 110 may be implemented using software that is executed by one or more computing devices located in or more data centers, geographic regions, etc.

A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console implemented as a website or application, etc. The interface(s) may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code-typically without the user having any control of or knowledge of the underlying compute instance(s) involved.

The ML service 110 may manage the creation and/or use of machine learning models on behalf of clients. Generally, the creation and use of a machine learning model may be associated with three stages or phases: a training phase where the model is trained (e.g., by a model training system 120), a testing phase where the model is tested (e.g., by a model testing system 130), and an inference phase where the model is applied to live data to produce inferences/predictions (e.g., by a model hosting system 140). In various embodiments, the ML service 110 may perform ML model training tasks, ML model testing tasks, and ML inference tasks. For example, the ML training system 120 may utilize training data (e.g., some or all of a dataset 108) from one or more data sources and may produce a trained model, which may be stored as results 121 of the training as a complete model 127 or model artifacts 123 (e.g., files or other data structures describing weights for the model, the structure of the model, etc., which can be used to generate a useable inference model). The ML testing system 130 may test the trained model 119 using testing data (e.g., a portion of the dataset 108) from one or more data sources and may produce a tested model 125. The ML hosting system 140 may apply the tested model 125 to inference input data from one or more data sources (e.g., a storage location, from a client request, etc.) to produce inferences.

As one example, the model hosting system 140 may use a model 125 to determine the likelihood of particular users clicking on particular advertisements in a web browser or other internet-enabled interface. The input to such a model may represent unique user identifiers, user demographic information, ad click histories for individual users, and so on. The inferences produced by such a model 125 may represent probability values or labels. As another example, the model hosting system 140 may use a model 125 to determine whether to offer home loans to loan applicants. The input to such a model may represent unique user identifiers, user income data, user credit histories, and so on. The inferences produced by such a model 125 may represent scores indicative of the attractiveness of individual applicants for the loans. Of course, many other types of models can be trained and used for countless applications.

As indicated above, an ML model may be associated with a collection of weights (e.g., associated with portions, layers, or nodes of a model) trained against a corpus of data, which has "learned" how to apply those weights to classify or interpret a new sample of data. A trained model 119 may be created through an automated process but may also be constructed by hand in a number of ways, such as by directly implementing code, by computing and manually entering parameterization, and so on. An ML model may be accompanied by a ruleset that interprets the model scores. A ruleset may consume a vector of features and produce a new vector (often a small one, e.g., containing only a single entry) that can be more directly used by other applications.

The data sources for model training, testing, and/or inference may include one or more database systems, data stores, tables, repositories, storage services, sources of streaming data, servers, applications, memory locations, and so on. For example, training data may be gathered by users or automated systems and used as input to an initial ML model to prepare the model to produce predictions. The training data may be formatted according to a schema and may represent a portion or all of a dataset 108. Similarly, testing data may be gathered by users or automated systems and used as input to a trained machine learning model 119 to verify that the model produces correct inferences with a sufficient accuracy. Testing data may also be formatted according to the schema and may represent a portion of an original dataset 108 that has been "held out" and not used for training the model. Inference input data may represent real-world data, may be gathered by users or automated systems, and may be used as input to the tested machine learning model 125 to produce predictions about real-world behavior.

The training, testing, and inference phases may be implemented in the same execution environment or in different execution environments. For example, in some embodiments, a unified machine learning framework may perform the training, testing, and inference in a hosted environment (e.g., using model training system 120, model testing system 130, and model hosting system 140) on behalf of clients. In some embodiments, training and/or testing tasks may be performed by clients to produce a model, and that model may be used to produce inferences in a hosted environment (e.g., using model hosting system 140) on behalf of a client. In some embodiments, the training and/or testing tasks may be performed in a hosted environment (e.g., using model training system 120 and/or model testing system 130) on behalf of a client, and the inference tasks may be performed in an external environment (e.g., using client-hosted servers or using another machine learning framework, via obtaining the model artifacts 123 resulting from the training and/or testing). Accordingly, any of the training, testing, and inference components 120/130/140 may represent individual systems or subsystems that are loosely coupled or decoupled from one another.

The model hosting system 140 may include a plurality of endpoints. Each endpoint may host (or be associated with) one or more machine learning models that are used to generate inferences. Each endpoint may include (or be associated with) one or more hosts or servers that perform inference tasks. The endpoints may be largely independent of one another such that the performance of one endpoint may not necessarily affect the operation of another endpoint. In some embodiments, an endpoint may include (or be associated with) a component for inference production. The inference production may apply a trained and tested machine learning model 125 to inference input data in order to generate inferences. The inferences may be produced in substantially real-time, e.g., with minimal delays after the receipt of the inference input data. The inferences may be used by an application, e.g., to make decisions. For example, if the inferences represent probability values or labels for the likelihood of particular users clicking on particular advertisements in a web browser, then the application may represent a web server that generates particular advertisements for particular users. As another example, if the inferences represent scores indicative of the attractiveness of individual applicants for loans, then the application may represent a loan system that generates loan offers or approves applications for loans. The loan system may be automated or may rely on user input to approve the recommendations generated by the model hosting system 140 as inferences.

In some embodiments, the ML service 110 includes an ML analysis system 112, which may be implemented as software executed by one or more computing devices. The ML analysis system 112 can obtain collected training data 126 that is provided by one or more training monitors 124, and evaluate one or more modification conditions 116 to determine when and how to modify a current training process of a model being trained by one or more training instances 122 of the model training system 120.

For example, at optional circle (1), a user 109 may utilize a computing device 104 to transmit a dataset 108 to the provider network 100 that may be utilized for training a ML model. This operation of circle (1) may correspond to an upload of the dataset 108 to a location of a storage service 114 of the provider network 100 that provides object storage.

Thereafter, the user 109 may utilize the computing device (e.g., via interacting with an application implementing a console 105 to utilize the provider network 100) to configure a machine learning training job to be run by the model training system 120 of the ML service 110, resulting in one or more messages being sent from the computing device 104 to the ML service 110 providing associated configuration data and/or providing a command to begin training. For example, the user 109 may provide, via the console 105, one or more of the following: an identifier of the dataset 108 (e.g., a location that stores the dataset, such as a URL), an identifier of a storage location for model training results 121 to be stored, an identifier of what type or amount of resources to use for the training (e.g., a compute instance size, a cluster size, etc.), an identifier of a model algorithm category or type (e.g., linear regression, logistic regression, k-means clustering, principal component analysis, factorization machines, neural topic modeling, latent dirichlet allocation, gradient boosted trees, sequence2sequence, time series forecasting, word2vec, image classification, etc.) or of a custom user-provided algorithm, etc.

Figure 2:
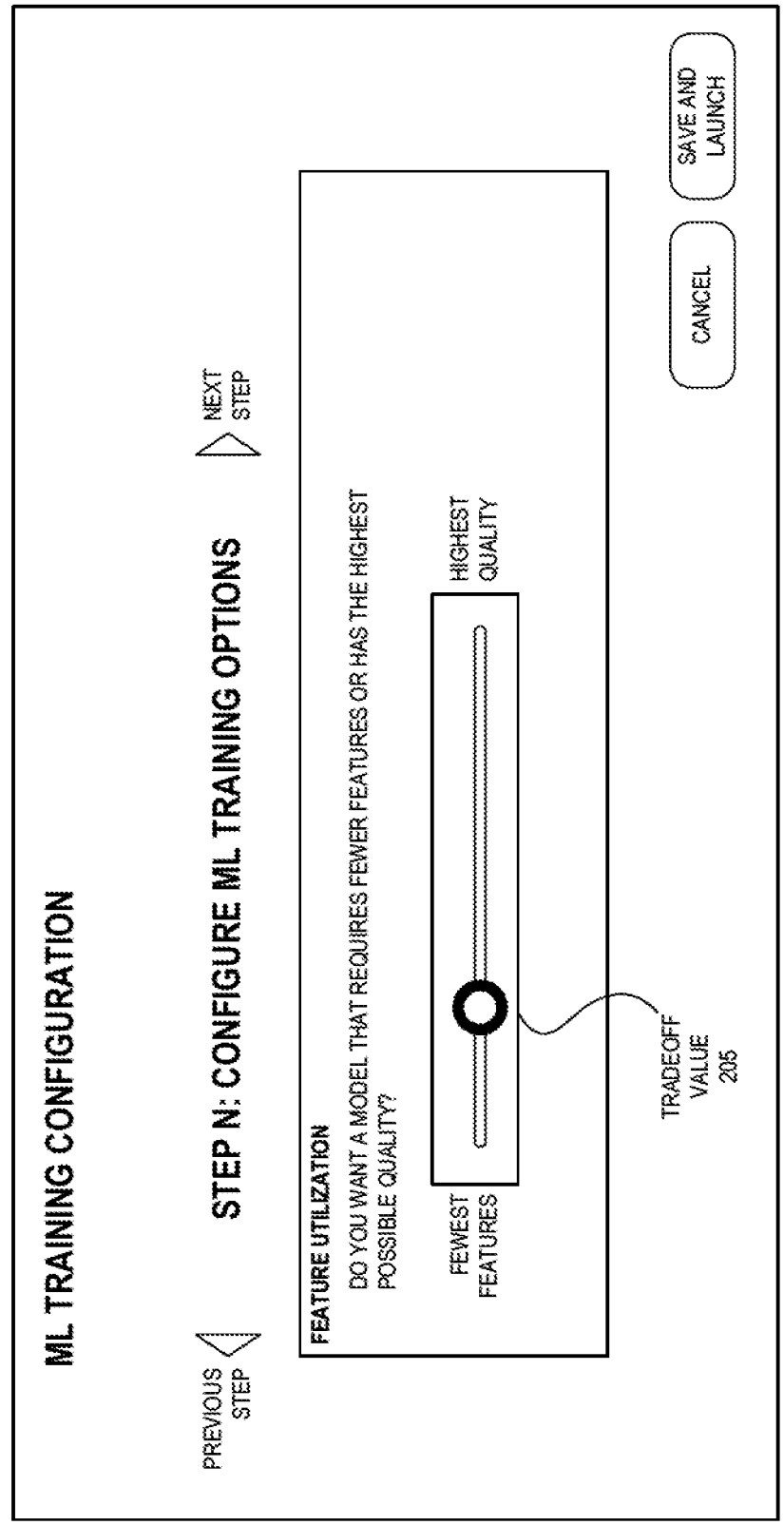
FIG. 2 is a diagram illustrating an exemplary graphical user interface with an input element for user-provided influence of adaptive machine learning training via in-flight feature modification according to some embodiments.

However, in some embodiments the user 109 provides a tradeoff value that impacts how the ML service 110 trains the model. For example, FIG. 2 is a diagram illustrating an exemplary graphical user interface 200 with an input element for user-provided influence of adaptive machine learning training via in-flight feature modification according to some embodiments. This exemplary user interface allows a user to indicate, by setting a tradeoff value 205, how aggressive the system should be in attempting to reduce the number of features required by the resulting model. In this user interface, a slider bar user input element allows the user to "slide" a circle to the left or right along a line, where at a far left end of the line the system is instructed to attempt to aggressively attempt to remove features, and where at a far right end of the line the system is instructed to attempt to maintain all features to preserve the utmost of quality (or, e.g., only remove features when it does not impact quality whatsoever, or only affects the resultant quality by less than some threshold). In some embodiments, the tradeoff value 205 may be a value that is based on where the circle is placed—e.g., the value is a whole number between 0-100, where the value may be zero when the circle is placed at the far left, one-hundred when the circle is placed at the far left, and so on. For example, as illustrated the tradeoff value 205 may be twenty (20). Of course, in other embodiments different user interfaces, user interface elements, types of the tradeoff value 205 may be used (e.g., a value between zero and one, a binary value indicating that the system should or should not attempt to remove features, etc.). As another example, a user could be asked to provide a value indicating how much of an accuracy drop the user is willing to accept (e.g., a 5% accuracy drop) if the system can find features to remove, for example.

Turning back to FIG. 1, upon receipt of the one or more messages, the ML service 110 may initiate the training of a model, e.g., using one or more training instances 122 (e.g., containers, virtual machines, or the like) of the model training system 120 at circle (3A). Additional detail regarding various technical techniques for training models in a model training system 120 are provided herein with regard to FIG. 7.

In some embodiments, the model training system 120 also launches (or utilizes/configures) one or more training monitors 124 at circle (3B). A training monitor 124 may be an application (e.g., run by a relatively small virtual machine or container) that may run alongside (or optionally, within) a training instance 122 to collect information regarding the state of the training job as it is performed.

In some embodiments, the training monitors 124 may capture training data 126 in the form of resource utilization data associated with model training, e.g., data usable for performance profiling such as processor usage metrics, memory usage metrics, storage usage metrics, I/O metrics, network usage metrics, and so on. Elements of the collected training data 126 may be associated with particular steps or intermediate states of the training process. The training data 126 may also represent metadata associated with the training process, e.g., a learning algorithm identifier, a learning step number, a timestamp, a container identifier, a host identifier, a cluster identifier, and/or other information usable to perform profiling of the training process. For example, in some embodiments, the collected training data 126 includes specific data reflecting the state of the model, such as current weights associated with portions of the model (e.g., layers, nodes, or the like), which may be used as described herein to generate feature relevance metric values.

The training monitors 124 may store the collected training data 126 using locally accessible storage resources of the corresponding hosts. To perform profiling of the model training, the machine learning analysis system 112 may retrieve this collected training data 126. In some embodiments, the collected training data 126 may be written to a data store external to the model training system 120, e.g., as managed by a storage service 114 of a provider network as reflected by circle (4), and the ML analysis system 112 may retrieve the collected training data 126 from that data store. The data store (including the particular storage location, bucket, or account within the data store) and other data collection parameter values may be identified by the user 109 associated with the model training. Alternatively, in some embodiments, the collected training data 126 may be streamed from the training instance(s) 122 (e.g., those instances of a cluster of nodes training a model) to the ML analysis system 112. Thus, by decoupling the ML analysis system 112 from the training instances 122 of the model training system 120, the computational/resource impact of the analysis on the training of the model may be significantly reduced.

Accordingly, as reflected by circle (5), the ML analysis system 112 can obtain the collected training data 126 (e.g., on a periodic basis, scheduled basis, etc.) and may use the collected training data 126 to perform automated analysis and modification of the model training. In some embodiments, the analysis may be performed according to thresholds, where the thresholds (and other customization of the analysis) may be specified by a client associated with the machine learning model, e.g., using an analysis configuration provided by the client in a user interface or programmatic interface. The analysis may be performed at appropriate times, e.g., after a step of the model training has been completed and the training data 126 has been emitted by the training monitor(s) 124.

In some embodiments, the ML analysis system 112 includes a metric generator 115 and a rule evaluation engine 117. As shown at circle (6A), the metric generator 115 can generate metrics during a training run for use in determining whether an in-progress training is to be modified.

For example, in some embodiments the metric generator 115 generates feature importance metrics that indicate the relative importance of each feature (as of that point in time in the training) for generating the ultimate inference. As is known to those of skill in the art, various techniques exist for generating such metrics, such as via use of the Shapley Additive explanation ("SHAP") measure, etc. In some embodiments, a feature importance metric can be generated for each feature used in the training, where a sum of all measures is equal to one. For example, a simple model with four equally important features may have four feature importance metric values that each equal 0.25. In contrast, a simple model with three important features and one relatively unimportant feature may have feature importance metric values of 0.35, 0.30, 0.28, and 0.07.

For example, in training a predictor model to determine whether a person can dunk a basketball, a user may provide features for training such as the height of the person, the weight, the vertical leap, the eye color, the wingspan, the hair color, the date of birth, the favorite food, etc. It is straightforward to see that some of these features will have more importance than others in this task—e.g., height and wingspan and vertical leap may be very important, where it is likely that the eye color or favorite food may be less predictive. Thus, the system can identify, using feature importance metric values, which features are the most important. Notably, this is a trivial example (involving perhaps 10 features) compared to most real-world scenarios, which may include 100s, 1000s, or even more features, and thus it may be very difficult for humans to make the determination of what features are truly the most helpful before actually training the model.

The rule evaluation engine 117 at circle (6B) may analyze the metric values according to one or more modification conditions 116 (of rules) to determine whether to modify an in-progress training job, and if so, how to modify the job. By way of example, one modification condition 116 may be satisfied when a feature importance metric value is beneath a threshold value (e.g., less than 0.01, less than 0.001, or the like). Such a modification condition 116 may be useful to eliminate features from being used that are not contributing in a meaningful way to making the ultimate inference, and thus the ML analysis system 112 can remove that feature from use in a remainder of the training. As a result, the ultimate model will not need that utilize that feature to generate inferences, leading to a reduction in the total needed number of features to be provided going forward. Beneficially, due to the smaller size of dataset, the training may be sped up, complicated features (that may be difficult for users to obtain) can be eliminated, inference can be faster due to less data being involved, and there will likely be a reduction in the odds of overfitting the model due to noise in the data.

As another example, a modification condition 116 may be satisfied when a feature importance metric value is greater than a threshold value (e.g., more than 0.50, more than 0.40, more than 0.75, or the like). Such a modification condition 116 may be useful to detect cases in which one feature dominates all other features, which could lead to the model not getting a full representation of the features, and thus the ML analysis system 112 can reduce the importance of that feature in a remainder of the training.

Notably, these thresholds may be directly configured/ selected by the user associated with the training job, may indirectly set by the user (e.g., through the tradeoff value 205 of FIG. 2, which can be used to set the thresholds), or simply set by the provider network.

In various embodiments, the ML analysis system 112 may be hosted in the same execution environment as the model training system 120 or in a different execution environment than the training system. For example, the ML analysis system 112 may be part of the same provider network or machine learning framework as the training system 120. As another example, the ML analysis system 112 may be hosted in a cloud computing environment, and the training system 120 may be hosted remotely on client premises (or in a different machine learning framework) and may be configured to perform the training data collection and to write the data 126 in an expected format to the data store of the storage service 114 (or otherwise provide the data to the analysis system).

The data store described herein may be external to the ML service 110. For example, the data store may represent a storage service 114 of a provider network 100, and the training data 126 may be written to a particular storage location (or set of locations) owned by the user associated with the model training job. By decoupling the data store from the model training system 120, the training monitors 124 may further reduce their impact on the latency of the training jobs.

By way of example, as shown in dashed lines, in some embodiments the metric generator 115 and/or rule evaluation engine 117 are implemented within the training monitors 124 themselves. However, in other embodiments the metric generator 115 and rule evaluation engine 117 are implemented separate from the training monitors 124 and training instances 122 to eliminate the burden of metric generation and rule analysis so that it does not negatively impact the speed of training by contending for the same computing resources.

Upon determining that a modification condition 116 is satisfied, an action that is associated with the condition (that collectively form a "rule") can be implemented. For example, the action may be to eliminate a particular feature from being used in the training or to change an importance of a feature within the training (e.g., by reducing its importance). To affect this action, at circle (7) the ML analysis system 112 may send one or more messages to the model training system 120. For example, the ML analysis system 112 may send one or more messages to a control plane entity of the model training system 120, to the training monitor(s) 124, or directly to the training instances 122 to command that the associated change is made. For example, in some embodiments, the ML analysis system 112 may send one or more messages to the model training system 120 control plane or to training monitor(s) 124 to command that they cause the associated change to be made (e.g., by modifying a configuration value or a data values used in the training, such that after a next step/phase of the training the training instances 122 will observe the modified configuration/data and adjust their training accordingly). As one example, the training monitor(s) 124 may communicate with the training instances 122 by writing to a configuration file that is accessible to both entities in a common file system.

By way of example, to "remove" (or suppress) a feature from use while the model is being trained, the values of that feature may be set to a same value—e.g., a blank value, NULL value, or other common value (such as an empty string, value of zero, etc.), so that over time the feature is relied upon less and less due to it no longer having any differing values that can be learned from. By way of another example, to reduce an importance of a feature, a sampling frequency may be reduced for the feature during the training—e.g., the training will only look at the feature 15% percent of the time—though there are other techniques for implementing these actions known to those of skill in the art that may also be used. As another example, an action may be to indicate that certain features should not be used by the model in certain ways, e.g., to indicate that a model implementing a decision tree should or should not use certain features in a particular decision path.

As a result, as the training continues, features may be suppressed over time and/or the importance of features may be modified. At some point the training may end, and results 121 of the training (e.g., files, logs, or other model artifacts 123 such as various node/layer weights for the model) may be stored to a location of a storage service 114 (that may have been indicated by the user 109 as part of circle (2)) as shown at optional circle (8A). Additionally, or alternatively, the trained model 119 may be sent to a model testing system 130 that may test the accuracy of the model, e.g., by using a testing data set (e.g., a subset of the dataset 108 that may have been held out and thus not used during training) at circle (8B), and/or the trained model 119 or the tested model 125 may be sent to a model hosting system 140 to be deployed behind an endpoint and used to generate inferences (e.g., for an application executed within the provider network 100 or outside the provider network 100) at optional circle (8C).

In some embodiments, a machine learning model (or code for training a machine learning model) may be encapsulated in a container for execution in a containerized environment, and the program code of the container need not be modified in order to perform the training data collection described herein. An execution environment may include or be associated with one or more systems, services, or other components that implement machine learning tasks. Any of the systems, services, or other components of an execution environment may be built on one or more computing devices such as the example computing device illustrated in FIG. 10. The execution environments may vary in terms of their underlying configurations. In one embodiment, the execution environments may include MapReduce-based cluster computing environments, stream processing systems, workflow systems such as Amazon Simple Workflow Service, and other suitable environments. In one embodiment, an execution environment may be implemented using a cluster of computing devices that cooperate to execute machine learning tasks. A cluster may be provisioned, launched, or otherwise spun up in order to perform one or more machine learning tasks. In one embodiment, a particular execution environment may use an orchestration framework such as Apache Hadoop, Apache Spark, and so on to manage a cluster.

Figure 10:
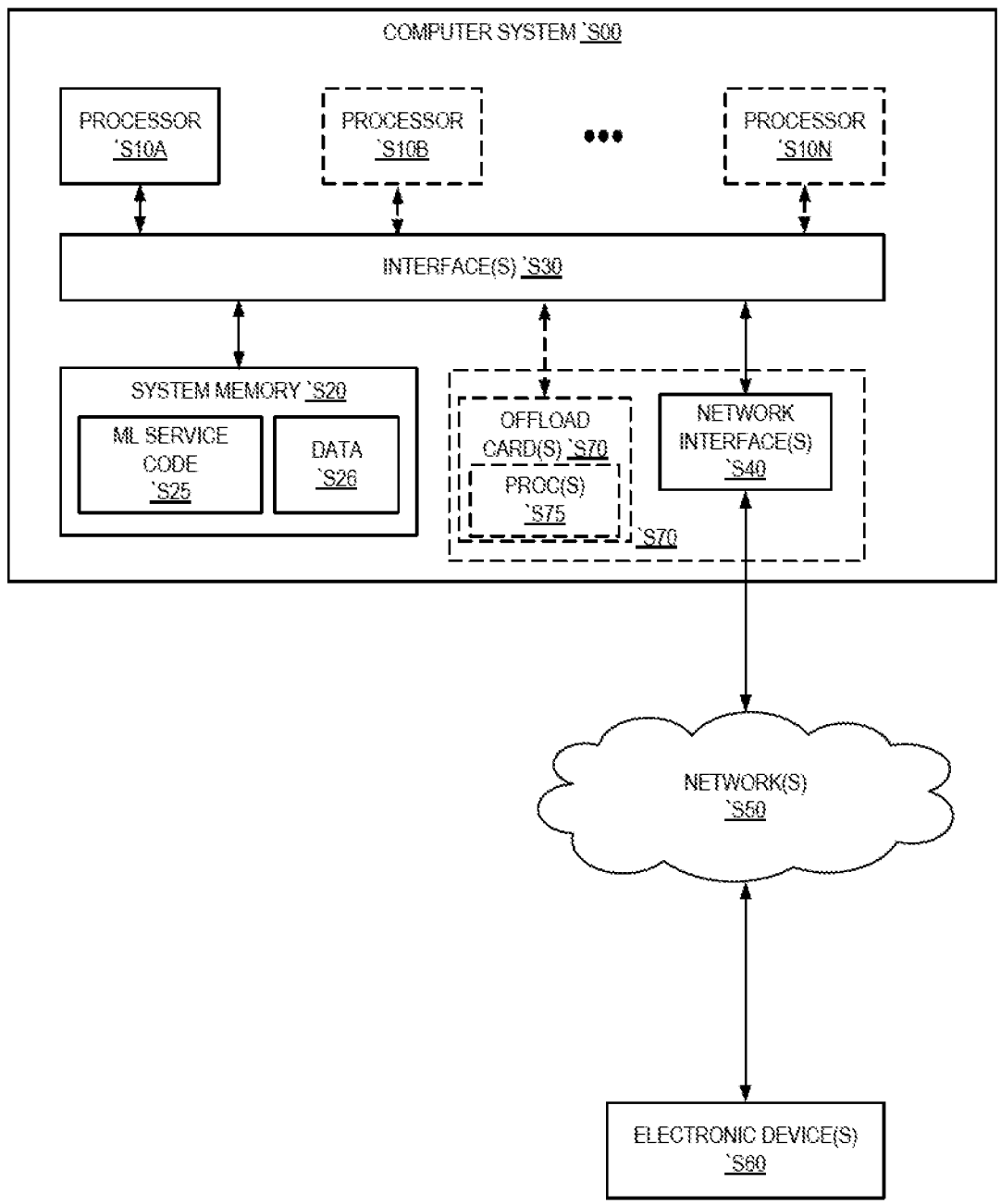
FIG. 10 is a block diagram illustrating an example computer system that may be used in some embodiments.

The machine learning system 110 may be implemented using any suitable number and configuration of computing devices, any of which may be implemented by the example computing device illustrated in FIG. 10. The computing devices may be located in any suitable number of data centers or geographical locations. In various embodiments, at least some of the functionality of the system 110 may be provided by the same computing device or by different computing devices. If any of the components of the system 110 are implemented using different computing devices, then the components and their respective computing devices may be communicatively coupled, e.g., via one or more networks. Each of the components of the system 110 may represent any combination of software and hardware usable to perform their respective functions, as discussed as follows. Operations implemented by the system 110 may be performed automatically, e.g., without a need for user initiation or user intervention after an initial configuration stage, and programmatically, e.g., by execution of program instructions on at least one computing device. It is contemplated that the system 110 may include additional components not shown, fewer components than shown, or different combinations, configurations, or quantities of the components shown.

One or more of the training system 120, testing system 130, hosting system 140, and/or analysis systems 112 may be implemented in a service-oriented system in which multiple services (e.g., services in one or more hosted execution environments) collaborate according to a service-oriented architecture. In such an environment, one or more of the training system 120, testing system 130, hosting system 140, and/or analysis systems 112 may offer their functionality as a service to multiple clients. To enable clients to invoke their functionality, the training system 120, testing system 130, hosting system 140, and/or analysis system 112 may expose any suitable interface(s), such as one or more APIs or other programmatic interfaces and/or graphical user interfaces (GUIs). A service may be implemented using a plurality of different instances that are distributed throughout one or more networks, and each instance may offer access to the functionality of the corresponding service to various clients. In one embodiment, the functionality of a machine learning task may be offered to clients in exchange for fees, or the cost associated with performing a machine learning task may be assessed to a responsible entity.

Components of the system 110 may convey network-based service requests to one another via one or more networks 106. In various embodiments, the network(s) may encompass any suitable combination of networking hardware and protocols necessary to establish network-based communications between components. For example, the network(s) may generally encompass the various telecommunications networks and service providers that collectively implement the Internet. The network(s) may also include private networks such as local area networks (LANs) or wide area networks (WANs) as well as public or private wireless networks. For example, two different components may be respectively provisioned within enterprises having their own internal networks. In such an embodiment, the network(s) may include the hardware (e.g., modems, routers, switches, load balancers, proxy servers, etc.) and software (e.g., protocol stacks, accounting software, firewall/security software, etc.) necessary to establish a networking link between the given component and the Internet as well as between the Internet and another component. It is noted that in some embodiments, components may communicate using a private network rather than the public Internet.

In one embodiment, components of the system 100 may be implemented using computing resources of a provider network. A provider network may represent a network set up by an entity such as a company or a public-sector organization to provide one or more services (such as various types of network-accessible computing or storage) accessible via the Internet and/or other networks to a distributed set of clients. A provider network may include numerous data centers hosting various resource pools, such as collections of physical and/or virtualized computer servers, storage devices, networking equipment and the like, that are used to implement and distribute the infrastructure and services offered by the provider. The compute resources may, in some embodiments, be offered to clients in units called "instances," such as virtual or physical compute instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like. Because resources of the provider network may be under the control of multiple clients (or tenants) simultaneously, the provider network may be said to offer multi-tenancy and may be termed a multi-tenant provider network.

Figure 3:
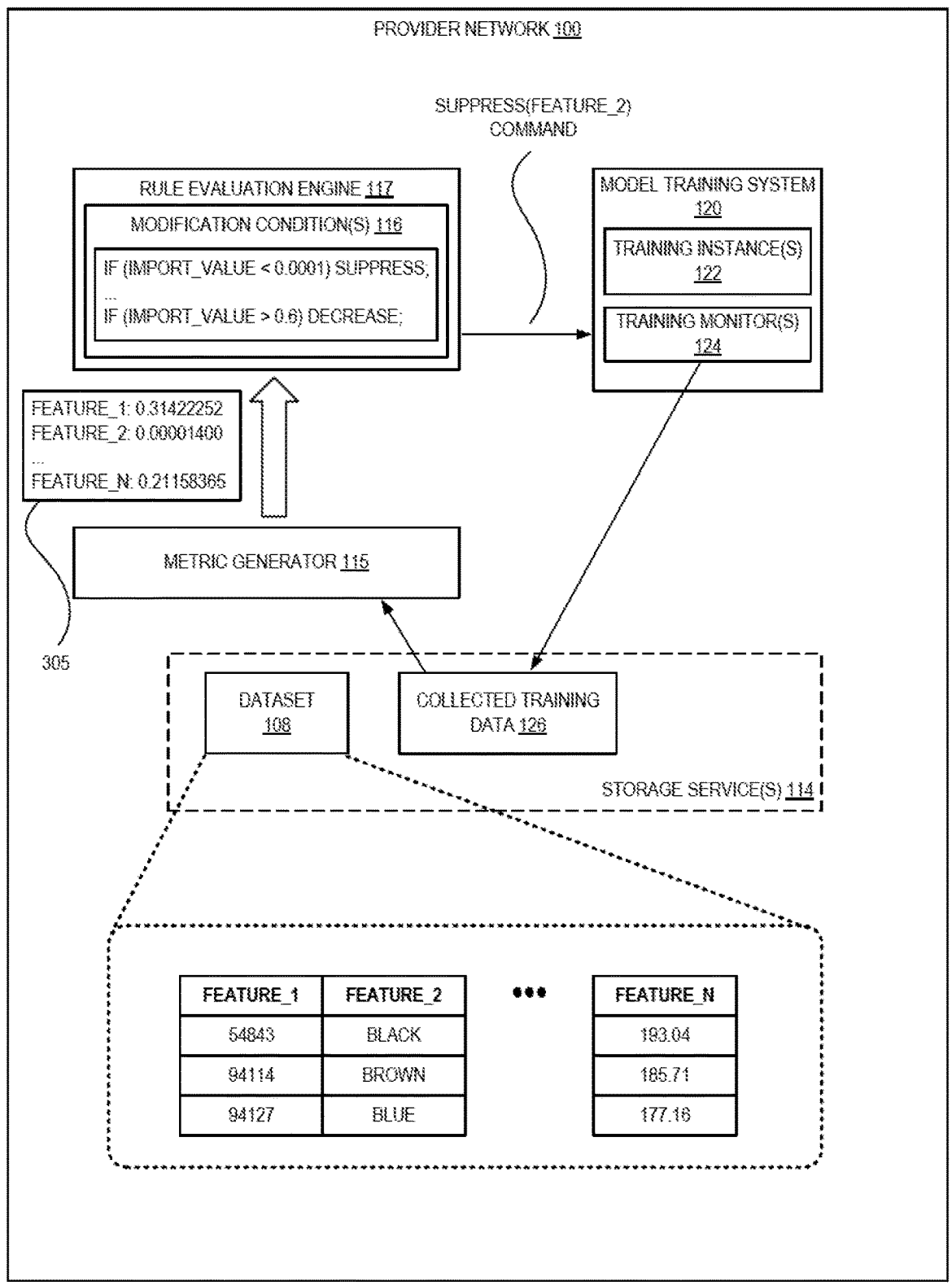
FIG. 3 is a diagram illustrating an exemplary use case of in-flight feature suppression during a machine learning training according to some embodiments.
Figure 4:
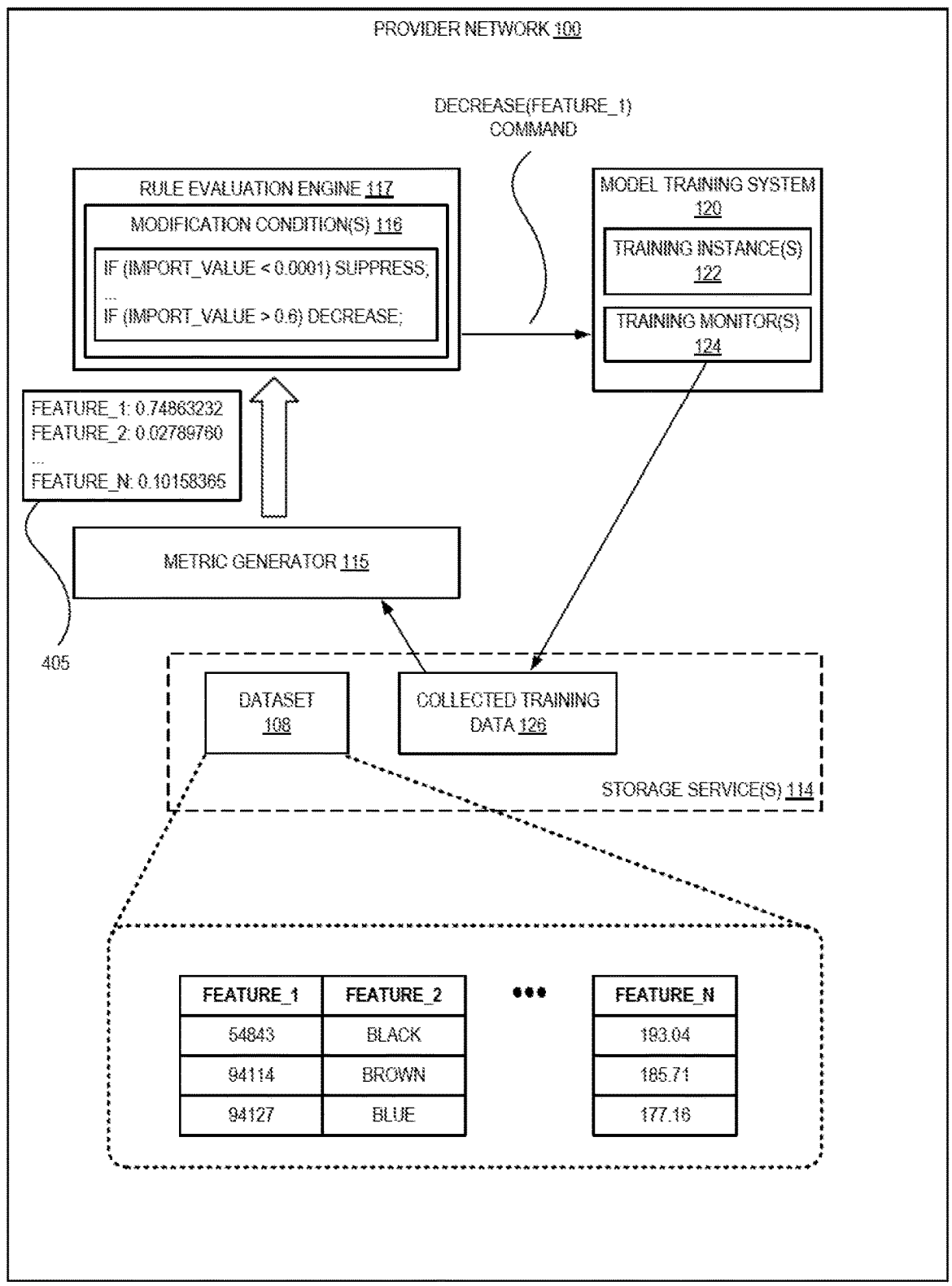
FIG. 4 is a diagram illustrating an exemplary use case of in-flight feature importance reduction during a machine learning training according to some embodiments.

For further detail regarding exemplary metric values and modification conditions, FIG. 3 is a diagram illustrating an exemplary use case of in-flight feature suppression during a machine learning training according to some embodiments, and FIG. 4 is a diagram illustrating an exemplary use case of in-flight feature importance reduction during a machine learning training according to some embodiments.

With regard to FIG. 3, an example dataset 108 is illustrated with several features 1-N, referred to as FEATURE_1, FEATURE_2, and FEATURE_N. In this example, based on a set of collected training data 126 generated after some portion of training (e.g., at a "step N" of the training), feature importance metric values 305 are generated by the metric generator 115. Based at least in part on these feature importance metric values 305 and a set of one or more modification conditions 116, the rule evaluation engine 117 determines that a first modification condition 116 is satisfied—here, IMPORT_VALUE<0.0001—for FEATURE_2, and thus the associated action (of removing/suppressing the feature from use) is caused to be performed by sending a "SUPPRESS" command message along with an identifier of FEATURE_2. Similarly, with regard to FIG. 4, assuming a different set of feature importance metric values 405, the rule evaluation engine 117 determines that a different modification condition 116 is satisfied—here, IMPORT_VALUE>0.6—for FEATURE_1, and thus the associated action (of reducing an importance of the feature) is caused to be performed by sending a "DECREASE" command message along with an identifier of FEATURE_1.

Figure 5:
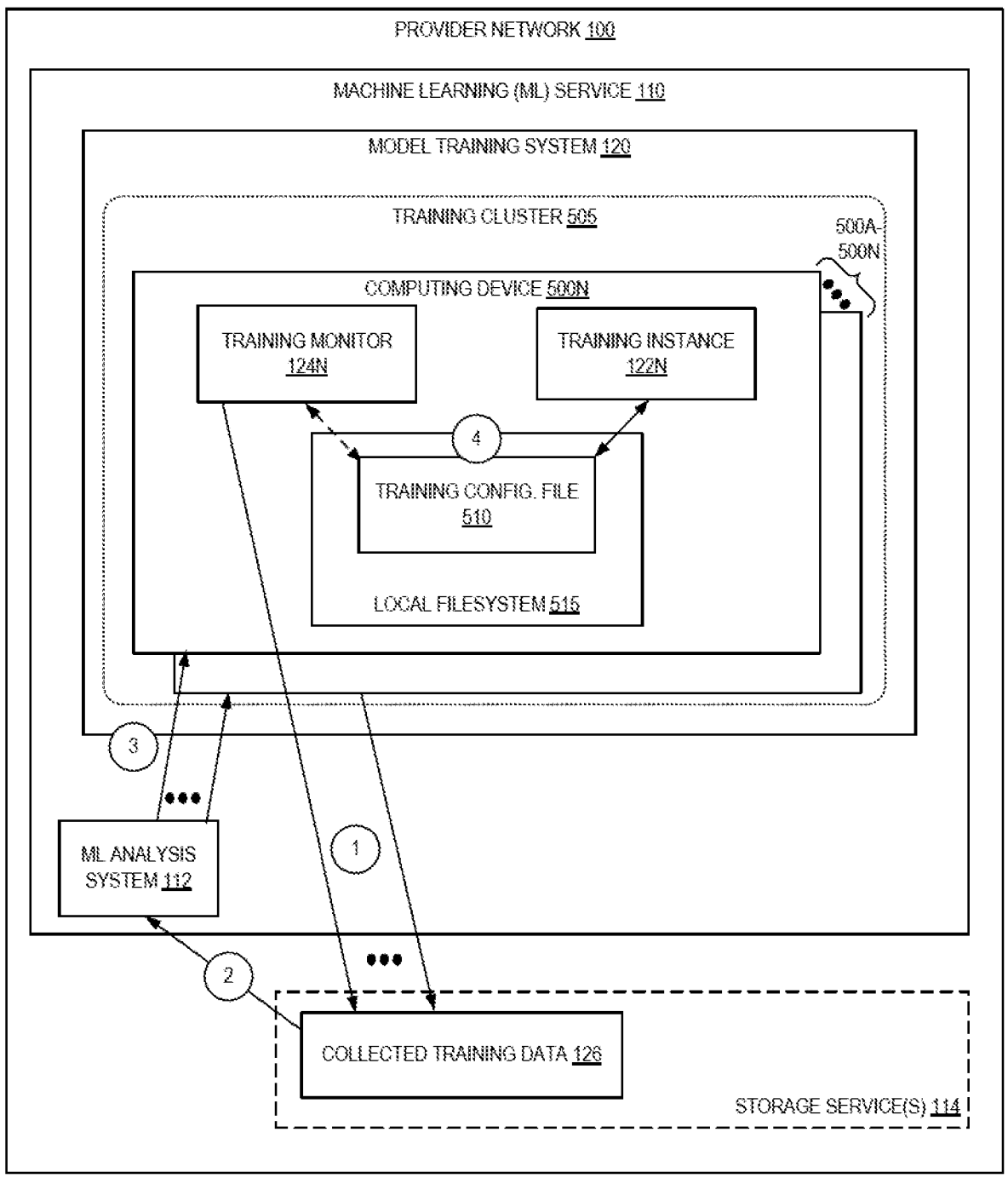
FIG. 5 is a diagram illustrating a filesystem-based technique for indirect communication between a co-instantiated training monitor and training instance according to some embodiments.

FIG. 5 is a diagram illustrating a filesystem-based technique for indirect communication between a co-instantiated training monitor 124N and training instance 122N (of a cluster 505 of training instances 122) according to some embodiments. In this example, a cluster 505 of training instances 122A-122N may work cooperatively to train a model, and at least one corresponding training monitor 124 may be run on each computing device 500N running a training instance 122N. As described herein, the training monitors 124A-124N can obtain training data 126 and store it to a storage service 114 location at circle (1), where it can be provided to a ML analysis system 112 at circle (2). At circle (3), the ML analysis system 112 may send messages to the computing device 500 to cause the training to be updated accordingly (e.g., without ending the training job and starting a new training job). For example, the messages may be provided to the training monitor 124N or to a control plane component associated with the model training system 120, which at circle (4) may update a training configuration file 510 of a local filesystem 515 to affect the change (e.g., by inserting a command or data to remove a feature or reduce an importance of a feature), which may be read and utilized by the training instance(s) 122 before they begin a new stage/phase of training.

Figure 6:
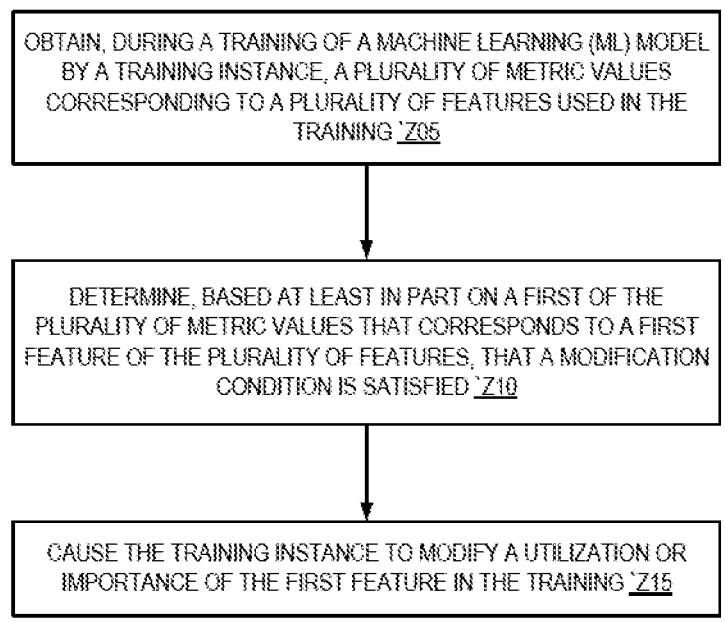
FIG. 6 is a flow diagram illustrating operations of a method for adaptive machine learning training via in-flight feature modification according to some embodiments.

FIG. 6 is a flow diagram illustrating operations 600 of a method for adaptive machine learning training via in-flight feature modification according to some embodiments. Some or all of the operations 600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by the ML service 110 and/or ML analysis system 112 of the other figures.

The operations 600 include, at block 602, obtaining, during a training of a machine learning (ML) model by at least one training instance, a plurality of metric values corresponding to a plurality of features used in the training. In some embodiments, each of the plurality of metric values indicates a relative importance of the corresponding feature within the training. In some embodiments, the training instance is executed within a multi-tenant provider network.

The operations 600 further include, at block 604, determining, based at least in part on a first of the plurality of metric values that corresponds to a first feature of the plurality of features, that a modification condition is satisfied.

The operations 600 further include, at block 606, causing the training instance to modify a utilization or importance of the first feature in the training.

In some embodiments, determining that the modification condition is satisfied comprises determining that the first metric value is less than a first threshold amount; and causing the training instance to modify the utilization or importance of the first feature includes causing the training instance to no longer utilize original values of the first feature in the training. In some embodiments, causing the training instance to no longer utilize the first feature in the training includes setting all values of the first feature in a training dataset to be a same value.

In some embodiments, determining that the modification condition is satisfied comprises determining that the first metric value is greater than a second threshold amount; and causing the training instance to modify the utilization or importance of the first feature includes causing the training instance to reduce the importance of the first feature in the training. In some embodiments, causing the training instance to reduce the importance of the first feature includes modifying a sampling rate associated with values of the first feature.

In some embodiments, causing the training instance to modify the utilization or importance of the first feature in the training comprises: modifying at least a metadata value associated with the first feature within a file provided by a filesystem, wherein the training instance reads the file at a conclusion of an iteration of the training and adjusts a subsequent iteration of the training based at least on the metadata value.

In some embodiments, the operations further include receiving a message originated by a computing device of a user that indicates a value; and setting the modification condition based at least in part on the value.

In some embodiments, the operations further include transmitting a message to a computing device of a user, the message indicating a set of features to be used as input for the trained ML model, wherein the set of features does not include the first feature.

In some embodiments, the operations further include deploying the ML model within the multi-tenant provider network behind an endpoint; receiving a request to perform inference using the ML model that was originated by a client that was directed to the endpoint; generating an inference using the ML model; and transmitting the inference to the client.

Figure 7:
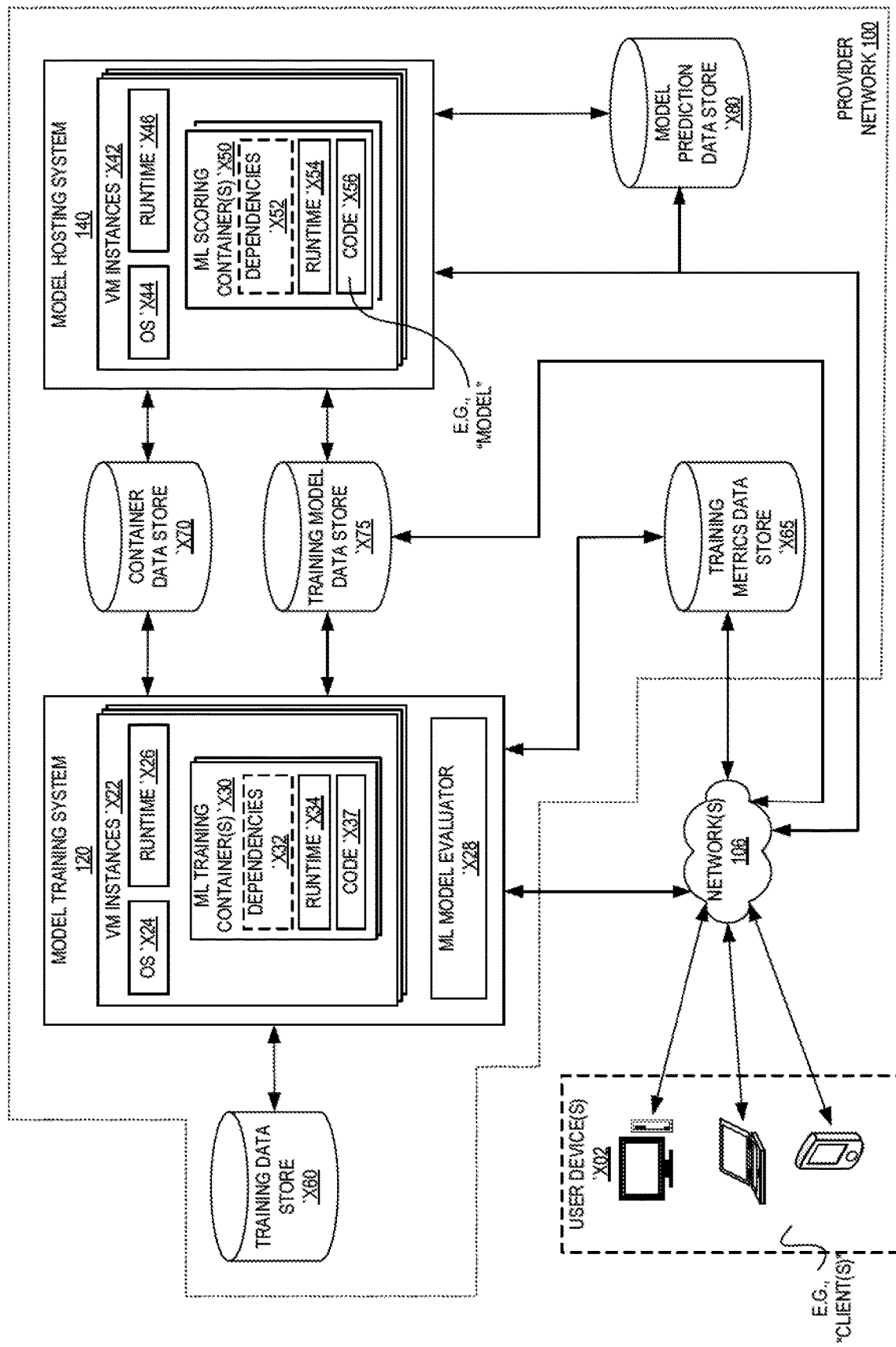
FIG. 7 is a block diagram of an illustrative operating environment in which machine learning models are trained and hosted according to some embodiments.

FIG. 7 is a block diagram of an illustrative operating environment in which machine learning models are trained and hosted according to some embodiments. The operating environment includes end user devices 702 (e.g., a PC or mobile device such as computing device 104), a model training system 120, a model hosting system 140, a training data store 760, a training metrics data store 765, a container data store 770, a training model data store 775, and a model prediction data store 780. A machine learning service 110 described herein may include one or more of these entities, such as the model hosting system 140, model training system 120, etc.

In some embodiments, users, by way of user devices 702, interact with the model training system 120 to provide data that causes the model training system 120 to train one or more machine learning models. A machine learning model, generally, may be thought of as one or more equations that are "trained" using a set of data. In some embodiments, the model training system 120 provides ML functionalities as a Web service, and thus messaging between user devices 702 and the model training system 120 (or provider network 100), and/or between components of the model training system 120 (or provider network 100), may utilize HTTP messages to transfer data in a machine-readable file format, such as XML or JSON.

The user devices 702 can interact with the model training system 120 via a frontend of the model training system 120. For example, a user device 702 can provide a training request to the frontend that includes a container image (or multiple container images, or an identifier of one or multiple locations where container images are stored), an indicator of input data (e.g., an address or location of input data), one or more hyperparameter values (e.g., values indicating how the algorithm will operate, how many algorithms to run in parallel, how many clusters into which to separate data, etc.), and/or information describing the computing machine on which to train a machine learning model (e.g., a graphical processing unit (GPU) instance type, a central processing unit (CPU) instance type, an amount of memory to allocate, a type of virtual machine instance to use for training, etc.).

In some embodiments, the container image can include one or more layers, where each layer represents an executable instruction. Some or all of the executable instructions together represent an algorithm that defines a machine learning model. The executable instructions (e.g., the algorithm) can be written in any programming language (e.g., Python, Ruby, C++, Java, etc.). In some embodiments, the algorithm is pre-generated and obtained by a user, via the user device 702, from an algorithm repository (e.g., a network-accessible marketplace, a data store provided by a machine learning training service, etc.). In some embodiments, the algorithm is completely user-generated or partially user-generated (e.g., user-provided code modifies or configures existing algorithmic code).

In some embodiments, instead of providing a container image (or identifier thereof) in the training request, the user device 702 may provide, in the training request, an algorithm written in any programming language. The model training system 120 packages the algorithm into a container (optionally with other code, such as a "base" ML algorithm supplemented with user-provided code) that is eventually loaded into a virtual machine instance 722 for training a machine learning model, as described in greater detail below. For example, a user, via a user device 702, may develop an algorithm/code using an application (e.g., an interactive web-based programming environment) and cause the algorithm/code to be provided—perhaps as part of a training request (or referenced in a training request)—to the model training system 120, where this algorithm/code may be containerized on its own or used together with an existing container having a machine learning framework, for example.

In some embodiments, instead of providing a container image in the training request, the user device 702 provides, in the training request, an indicator of a container image (e.g., an indication of an address or a location at which a container image is stored). For example, the container image can be stored in a container data store 770, and this container image may have been previously created/uploaded by the user. The model training system 120 can retrieve the container image from the indicated location and create a container using the retrieved container image. The container is then loaded into a virtual machine instance 722 for training a machine learning model, as described in greater detail below.

The model training system 120 can use the information provided by the user device 702 to train a machine learning model in one or more pre-established virtual machine instances 722 in some embodiments. In particular, the model training system 120 includes a single physical computing device or multiple physical computing devices that are interconnected using one or more computing networks (not shown), where the physical computing device(s) host one or more virtual machine instances 722. The model training system 120 can handle the acquisition and configuration of compute capacity (e.g., containers, instances, etc., which are described in greater detail below) based on the information describing the computing machine on which to train a machine learning model provided by the user device 702. The model training system 120 can then train machine learning models using the compute capacity, as is described in greater detail below. The model training system 120 can automatically scale up and down based on the volume of training requests received from user devices 702 via frontend, thereby relieving the user from the burden of having to worry about over-utilization (e.g., acquiring too little computing resources and suffering performance issues) or under-utilization (e.g., acquiring more computing resources than necessary to train the machine learning models, and thus overpaying).

In some embodiments, the virtual machine instances 722 are utilized to execute tasks. For example, such tasks can include training a machine learning model. As shown in FIG. 7, each virtual machine instance 722 includes an operating system (OS) 724, a language runtime 726, and one or more ML training containers 730. Generally, the ML training containers 730 are logical units created within a virtual machine instance using the resources available on that instance and can be utilized to isolate execution of a task from other processes (e.g., task executions) occurring in the instance. In some embodiments, the ML training containers 730 are formed from one or more container images and a top container layer. Each container image may further include one or more image layers, where each image layer represents an executable instruction. As described above, some or all of the executable instructions together represent an algorithm that defines a machine learning model. Changes made to the ML training containers 730 (e.g., creation of new files, modification of existing files, deletion of files, etc.) are stored in the top container layer. If a ML training container 730 is deleted, the top container layer is also deleted. However, the container image(s) that form a portion of the deleted ML training container 730 can remain unchanged. The ML training containers 730 can be implemented, for example, as Linux containers (LXC), Docker containers, and the like.

The ML training containers 730 may include individual a runtime 734, code 737, and dependencies 732 needed by the code 737 in some embodiments. The runtime 734 can be defined by one or more executable instructions that form at least a portion of a container image that is used to form the ML training container 730 (e.g., the executable instruction (s) in the container image that define the operating system and/or runtime to run in the container formed from the container image). The code 737 includes one or more executable instructions that form at least a portion of a container image that is used to form the ML training container 730. For example, the code 737 includes the executable instructions in the container image that represent an algorithm that defines a machine learning model, which may reference (or utilize) code or libraries from dependencies 732. The runtime 734 is configured to execute the code 737 in response to an instruction to begin machine learning model training. Execution of the code 737 results in the generation of model data, as described in greater detail below.

In some embodiments, the code 737 includes executable instructions that represent algorithms that define different machine learning models. For example, the code 737 includes one set of executable instructions that represent a first algorithm that defines a first machine learning model and a second set of executable instructions that represent a second algorithm that defines a second machine learning model. In some embodiments, the virtual machine instance 722 executes the code 737 and trains all of the machine learning models. In some embodiments, the virtual machine instance 722 executes the code 737, selecting one of the machine learning models to train. For example, the virtual machine instance 722 can identify a type of training data indicated by the training request and select a machine learning model to train (e.g., execute the executable instructions that represent an algorithm that defines the selected machine learning model) that corresponds with the identified type of training data.

In some embodiments, the runtime 734 is the same as the runtime 726 utilized by the virtual machine instance 722. In some embodiments, the runtime 734 is different than the runtime 726 utilized by the virtual machine instance 722.

In some embodiments, the model training system 120 uses one or more container images included in a training request (or a container image retrieved from the container data store 770 in response to a received training request) to create and initialize a ML training container 730 in a virtual machine instance 722. For example, the model training system 120 creates a ML training container 730 that includes the container image(s) and/or a top container layer.

Prior to beginning the training process, in some embodiments, the model training system 120 retrieves training data from the location indicated in the training request. For example, the location indicated in the training request can be a location in the training data store 760. Thus, the model training system 120 retrieves the training data from the indicated location in the training data store 760. In some embodiments, the model training system 120 does not retrieve the training data prior to beginning the training process. Rather, the model training system 120 streams the training data from the indicated location during the training process. For example, the model training system 120 can initially retrieve a portion of the training data and provide the retrieved portion to the virtual machine instance 722 training the machine learning model. Once the virtual machine instance 722 has applied and used the retrieved portion or once the virtual machine instance 722 is about to use all of the retrieved portion (e.g., a buffer storing the retrieved portion is nearly empty), then the model training system 120 can retrieve a second portion of the training data and provide the second retrieved portion to the virtual machine instance 722, and so on.

To perform the machine learning model training, the virtual machine instance 722 executes code 737 stored in the ML training container 730 in some embodiments. For example, the code 737 includes some or all of the executable instructions that form the container image of the ML training container 730 initialized therein. Thus, the virtual machine instance 722 executes some or all of the executable instructions that form the container image of the ML training container 730 initialized therein to train a machine learning model. The virtual machine instance 722 executes some or all of the executable instructions according to the hyperparameter values included in the training request. As an illustrative example, the virtual machine instance 722 trains a machine learning model by identifying values for certain parameters (e.g., coefficients, weights, centroids, etc.). The identified values depend on hyperparameters that define how the training is performed. Thus, the virtual machine instance 722 can execute the executable instructions to initiate a machine learning model training process, where the training process is run using the hyperparameter values included in the training request. Execution of the executable instructions can include the virtual machine instance 722 applying the training data retrieved by the model training system 120 as input parameters to some or all of the instructions being executed.

In some embodiments, executing the executable instructions causes the virtual machine instance 722 (e.g., the ML training container 730) to generate model data. For example, the ML training container 730 generates model data and stores the model data in a file system of the ML training container 730. The model data includes characteristics of the machine learning model being trained, such as a number of layers in the machine learning model, hyperparameters of the machine learning model, coefficients of the machine learning model, weights of the machine learning model, and/or the like. In particular, the generated model data includes values for the characteristics that define a machine learning model being trained. In some embodiments, executing the executable instructions causes a modification to the ML training container 730 such that the model data is written to the top container layer of the ML training container 730 and/or the container image(s) that forms a portion of the ML training container 730 is modified to include the model data.

The virtual machine instance 722 (or the model training system 120 itself) pulls the generated model data from the ML training container 730 and stores the generated model data in the training model data store 775 in an entry associated with the virtual machine instance 722 and/or the machine learning model being trained. In some embodiments, the virtual machine instance 722 generates a single file that includes model data and stores the single file in the training model data store 775. In some embodiments, the virtual machine instance 722 generates multiple files during the course of training a machine learning model, where each file includes model data. In some embodiments, each model data file includes the same or different model data information (e.g., one file identifies the structure of an algorithm, another file includes a list of coefficients, etc.). The virtual machine instance 722 can package the multiple files into a single file once training is complete and store the single file in the training model data store 775. Alternatively, the virtual machine instance 722 stores the multiple files in the training model data store 775. The virtual machine instance 722 stores the file(s) in the training model data store 775 while the training process is ongoing and/or after the training process is complete.

In some embodiments, the virtual machine instance 722 regularly stores model data file(s) in the training model data store 775 as the training process is ongoing. Thus, model data file(s) can be stored in the training model data store 775 at different times during the training process. Each set of model data files corresponding to a particular time or each set of model data files present in the training model data store 775 as of a particular time could be checkpoints that represent different versions of a partially-trained machine learning model during different stages of the training process. Accordingly, before training is complete, a user, via the user device 702 can submit a deployment and/or execution request in a manner as described below to deploy and/or execute a version of a partially trained machine learning model (e.g., a machine learning model trained as of a certain stage in the training process). A version of a partially-trained machine learning model can be based on some or all of the model data files stored in the training model data store 775.

In some embodiments, a virtual machine instance 722 executes code 737 stored in a plurality of ML training containers 730. For example, the algorithm included in the container image can be in a format that allows for the parallelization of the training process. Thus, the model training system 120 can create multiple copies of the container image provided in a training request and cause the virtual machine instance 722 to load each container image copy in a separate ML training container 730. The virtual machine instance 722 can then execute, in parallel, the code 737 stored in the ML training containers 730. The virtual machine instance 722 can further provide configuration information to each ML training container 730 (e.g., information indicating that 'N' ML training containers 730 are collectively training a machine learning model and that a particular ML training container 730 receiving the configuration information is ML training container 730 number X of N), which can be included in the resulting model data. By parallelizing the training process, the model training system 120 can significantly reduce the training time in some embodiments.

In some embodiments, a plurality of virtual machine instances 722 execute code 737 stored in a plurality of ML training containers 730. For example, the resources used to train a particular machine learning model can exceed the limitations of a single virtual machine instance 722. However, the algorithm included in the container image can be in a format that allows for the parallelization of the training process. Thus, the model training system 120 can create multiple copies of the container image provided in a training request, initialize multiple virtual machine instances 722, and cause each virtual machine instance 722 to load a container image copy in one or more separate ML training containers 730. The virtual machine instances 722 can then each execute the code 737 stored in the ML training containers 730 in parallel. The model training system 120 can further provide configuration information to each ML training container 730 via the virtual machine instances 722 (e.g., information indicating that N ML training containers 730 are collectively training a machine learning model and that a particular ML training container 730 receiving the configuration information is ML training container 730 number X of N, information indicating that M virtual machine instances 722 are collectively training a machine learning model and that a particular ML training container 730 receiving the configuration information is initialized in virtual machine instance 722 number Y of M, etc.), which can be included in the resulting model data. As described above, by parallelizing the training process, the model training system 120 can significantly reduce the training time in some embodiments.

In some embodiments, the model training system 120 includes a plurality of physical computing devices and two or more of the physical computing devices hosts one or more virtual machine instances 722 that execute the code 737. Thus, the parallelization can occur over different physical computing devices in addition to over different virtual machine instances 722 and/or ML training containers 730.

In some embodiments, the model training system 120 includes a ML model evaluator 728. The ML model evaluator 728 can monitor virtual machine instances 722 as machine learning models are being trained, obtaining the generated model data and processing the obtained model data to generate model metrics. For example, the model metrics can include quality metrics, such as an error rate of the machine learning model being trained, a statistical distribution of the machine learning model being trained, a latency of the machine learning model being trained, a confidence level of the machine learning model being trained (e.g., a level of confidence that the accuracy of the machine learning model being trained is known, etc. The ML model evaluator 728 can obtain the model data for a machine learning model being trained and evaluation data from the training data store 760. The evaluation data is separate from the data used to train a machine learning model and includes both input data and expected outputs (e.g., known results), and thus the ML model evaluator 728 can define a machine learning model using the model data and execute the machine learning model by providing the input data as inputs to the machine learning model. The ML model evaluator 728 can then compare the outputs of the machine learning model to the expected outputs and determine one or more quality metrics of the machine learning model being trained based on the comparison (e.g., the error rate can be a difference or distance between the machine learning model outputs and the expected outputs).

The ML model evaluator 728 periodically generates model metrics during the training process and stores the model metrics in the training metrics data store 765 in some embodiments. While the machine learning model is being trained, a user, via the user device 702, can access and retrieve the model metrics from the training metrics data store 765. The user can then use the model metrics to determine whether to adjust the training process and/or to stop the training process. For example, the model metrics can indicate that the machine learning model is performing poorly (e.g., has an error rate above a threshold value, has a statistical distribution that is not an expected or desired distribution (e.g., not a binomial distribution, a Poisson distribution, a geometric distribution, a normal distribution, Gaussian distribution, etc.), has an execution latency above a threshold value, has a confidence level below a threshold value)) and/or is performing progressively worse (e.g., the quality metric continues to worsen over time). In response, in some embodiments, the user, via the user device 702, can transmit a request to the model training system 120 to modify the machine learning model being trained (e.g., transmit a modification request). The request can include a new or modified container image, a new or modified algorithm, new or modified hyperparameter(s), and/or new or modified information describing the computing machine on which to train a machine learning model. The model training system 120 can modify the machine learning model accordingly. For example, the model training system 120 can cause the virtual machine instance 722 to optionally delete an existing ML training container 730, create and initialize a new ML training container 730 using some or all of the information included in the request, and execute the code 737 stored in the new ML training container 730 to restart the machine learning model training process. As another example, the model training system 120 can cause the virtual machine instance 722 to modify the execution of code stored in an existing ML training container 730 according to the data provided in the modification request. In some embodiments, the user, via the user device 702, can transmit a request to the model training system 120 to stop the machine learning model training process. The model training system 120 can then instruct the virtual machine instance 722 to delete the ML training container 730 and/or to delete any model data stored in the training model data store 775.

As described below, in some embodiments, the model data stored in the training model data store 775 is used by the model hosting system 140 to deploy machine learning models. Alternatively, or additionally, a user device 702 or another computing device (not shown) can retrieve the model data from the training model data store 775 to implement a learning algorithm in an external device. As an illustrative example, a robotic device can include sensors to capture input data. A user device 702 can retrieve the model data from the training model data store 775 and store the model data in the robotic device. The model data defines a machine learning model. Thus, the robotic device can provide the captured input data as an input to the machine learning model, resulting in an output. The robotic device can then perform an action (e.g., move forward, raise an arm, generate a sound, etc.) based on the resulting output.

While the virtual machine instances 722 are shown in FIG. 7 as a single grouping of virtual machine instances 722, some embodiments of the present application separate virtual machine instances 722 that are actively assigned to execute tasks from those virtual machine instances 722 that are not actively assigned to execute tasks. For example, those virtual machine instances 722 actively assigned to execute tasks are grouped into an "active pool," while those virtual machine instances 722 not actively assigned to execute tasks are placed within a "warming pool." In some embodiments, those virtual machine instances 722 within the warming pool can be pre-initialized with an operating system, language runtimes, and/or other software required to enable rapid execution of tasks (e.g., rapid initialization of machine learning model training in ML training container(s) 730) in response to training requests.

In some embodiments, the model training system 120 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (e.g., user devices 702, the model hosting system 140, etc.). The processing unit can also communicate to and from a memory of a virtual machine instance 722 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the model hosting system 140 includes a single physical computing device or multiple physical computing devices that are interconnected using one or more computing networks (not shown), where the physical computing device(s) host one or more virtual machine instances 742. The model hosting system 140 can handle the acquisition and configuration of compute capacity (e.g., containers, instances, etc.) based on demand for the execution of trained machine learning models. The model hosting system 140 can then execute machine learning models using the compute capacity, as is described in greater detail below. The model hosting system 140 can automatically scale up and down based on the volume of execution requests received from user devices 702 via frontend 749 of the model hosting system 140, thereby relieving the user from the burden of having to worry about over-utilization (e.g., acquiring too little computing resources and suffering performance issues) or under-utilization (e.g., acquiring more computing resources than necessary to run the machine learning models, and thus overpaying).

In some embodiments, the virtual machine instances 742 are utilized to execute tasks. For example, such tasks can include executing a machine learning model. As shown in FIG. 7, each virtual machine instance 742 includes an operating system (OS) 744, a language runtime 746, and one or more ML scoring containers 750. The ML scoring containers 750 are similar to the ML training containers 730 in that the ML scoring containers 750 are logical units created within a virtual machine instance using the resources available on that instance and can be utilized to isolate execution of a task from other processes (e.g., task executions) occurring in the instance. In some embodiments, the ML scoring containers 750 are formed from one or more container images and a top container layer. Each container image further includes one or more image layers, where each image layer represents an executable instruction. As described above, some or all of the executable instructions together represent an algorithm that defines a machine learning model. Changes made to the ML scoring containers 750 (e.g., creation of new files, modification of existing files, deletion of files, etc.) are stored in the top container layer. If a ML scoring container 750 is deleted, the top container layer is also deleted. However, the container image(s) that form a portion of the deleted ML scoring container 750 can remain unchanged. The ML scoring containers 750 can be implemented, for example, as Linux containers.

The ML scoring containers 750 each include a runtime 754, code 756, and dependencies 752 (e.g., supporting software such as libraries) needed by the code 756 in some embodiments. The runtime 754 can be defined by one or more executable instructions that form at least a portion of a container image that is used to form the ML scoring container 750 (e.g., the executable instruction(s) in the container image that define the operating system and/or runtime to run in the container formed from the container image). The code 756 includes one or more executable instructions that form at least a portion of a container image that is used to form the ML scoring container 750. For example, the code 756 includes the executable instructions in the container image that represent an algorithm that defines a machine learning model, which may reference dependencies 752. The code 756 can also include model data that represent characteristics of the defined machine learning model, as described in greater detail below. The runtime 754 is configured to execute the code 756 in response to an instruction to begin execution of a machine learning model. Execution of the code 756 results in the generation of outputs (e.g., predicted or "inferred" results), as described in greater detail below.

In some embodiments, the runtime 754 is the same as the runtime 746 utilized by the virtual machine instance 742. In some embodiments, runtime 754 is different than the runtime 746 utilized by the virtual machine instance 742.

In some embodiments, the model hosting system 140 uses one or more container images included in a deployment request (or a container image retrieved from the container data store 770 in response to a received deployment request) to create and initialize a ML scoring container 750 in a virtual machine instance 742. For example, the model hosting system 140 creates a ML scoring container 750 that includes the container image(s) and/or a top container layer.

As described above, a user device 702 can submit a deployment request and/or an execution request to the model hosting system 140 via the frontend 749 in some embodiments. A deployment request causes the model hosting system 140 to deploy a trained machine learning model into a virtual machine instance 742. For example, the deployment request can include an identification of an endpoint (e.g., an endpoint name, such as an HTTP endpoint name) and an identification of one or more trained machine learning models (e.g., a location of one or more model data files stored in the training model data store 775). Optionally, the deployment request also includes an identification of one or more container images stored in the container data store 770.

Upon receiving the deployment request, the model hosting system 140 initializes ones or more ML scoring containers 750 in one or more hosted virtual machine instance 742. In embodiments in which the deployment request includes an identification of one or more container images, the model hosting system 140 forms the ML scoring container(s) 750 from the identified container image(s). For example, a container image identified in a deployment request can be the same container image used to form an ML training container 730 used to train the machine learning model corresponding to the deployment request. Thus, the code 756 of the ML scoring container(s) 750 includes one or more executable instructions in the container image(s) that represent an algorithm that defines a machine learning model. In embodiments in which the deployment request does not include an identification of a container image, the model hosting system 140 forms the ML scoring container(s) 750 from one or more container images stored in the container data store 770 that are appropriate for executing the identified trained machine learning model(s). For example, an appropriate container image can be a container image that includes executable instructions that represent an algorithm that defines the identified trained machine learning model(s).

The model hosting system 140 further forms the ML scoring container(s) 750 by retrieving model data corresponding to the identified trained machine learning model(s)

in some embodiments. For example, the deployment request can identify a location of model data file(s) stored in the training model data store 775. In embodiments in which a single model data file is identified in the deployment request, the model hosting system 140 retrieves the identified model data file from the training model data store 775 and inserts the model data file into a single ML scoring container 750, which forms a portion of code 756. In some embodiments, the model data file is archived or compressed (e.g., formed from a package of individual files). Thus, the model hosting system 140 unarchives or decompresses the model data file to obtain multiple individual files and inserts the individual files into the ML scoring container 750. In some embodiments, the model hosting system 140 stores the model data file in the same location as the location in which the model data file was stored in the ML training container 730 that generated the model data file. For example, the model data file initially was stored in the top container layer of the ML training container 730 at a certain offset, and the model hosting system 140 then stores the model data file in the top container layer of the ML scoring container 750 at the same offset.

In embodiments in which multiple model data files are identified in the deployment request, the model hosting system 140 retrieves the identified model data files from the training model data store 775. The model hosting system 140 can insert the model data files into the same ML scoring container 750, into different ML scoring containers 750 initialized in the same virtual machine instance 742, or into different ML scoring containers 750 initialized in different virtual machine instances 742. As an illustrative example, the deployment request can identify multiple model data files corresponding to different trained machine learning models because the trained machine learning models are related (e.g., the output of one trained machine learning model is used as an input to another trained machine learning model). Thus, the user may desire to deploy multiple machine learning models to eventually receive a single output that relies on the outputs of multiple machine learning models.

In some embodiments, the model hosting system 140 associates the initialized ML scoring container(s) 750 with the endpoint identified in the deployment request. For example, each of the initialized ML scoring container(s) 750 can be associated with a network address. The model hosting system 140 can map the network address(es) to the identified endpoint, and the model hosting system 140 or another system (e.g., a routing system, not shown) can store the mapping. Thus, a user device 702 can refer to trained machine learning model(s) stored in the ML scoring container(s) 750 using the endpoint. This allows for the network address of an ML scoring container 750 to change without causing the user operating the user device 702 to change the way in which the user refers to a trained machine learning model.

Once the ML scoring container(s) 750 are initialized, the ML scoring container(s) 750 are ready to execute trained machine learning model(s). In some embodiments, the user device 702 transmits an execution request to the model hosting system 140 via the frontend 749, where the execution request identifies an endpoint and includes an input to a machine learning model (e.g., a set of input data). The model hosting system 140 or another system (e.g., a routing system, not shown) can obtain the execution request, identify the ML scoring container(s) 750 corresponding to the identified endpoint, and route the input to the identified ML scoring container(s) 750.

In some embodiments, a virtual machine instance 742 executes the code 756 stored in an identified ML scoring container 750 in response to the model hosting system 140 receiving the execution request. In particular, execution of the code 756 causes the executable instructions in the code 756 corresponding to the algorithm to read the model data file stored in the ML scoring container 750, use the input included in the execution request as an input parameter, and generate a corresponding output. As an illustrative example, the algorithm can include coefficients, weights, layers, cluster centroids, and/or the like. The executable instructions in the code 756 corresponding to the algorithm can read the model data file to determine values for the coefficients, weights, layers, cluster centroids, and/or the like. The executable instructions can include input parameters, and the input included in the execution request can be supplied by the virtual machine instance 742 as the input parameters. With the machine learning model characteristics and the input parameters provided, execution of the executable instructions by the virtual machine instance 742 can be completed, resulting in an output.

In some embodiments, the virtual machine instance 742 stores the output in the model prediction data store 780. Alternatively or in addition, the virtual machine instance 742 transmits the output to the user device 702 that submitted the execution result via the frontend 749.

In some embodiments, the execution request corresponds to a group of related trained machine learning models. Thus, the ML scoring container 750 can transmit the output to a second ML scoring container 750 initialized in the same virtual machine instance 742 or in a different virtual machine instance 742. The virtual machine instance 742 that initialized the second ML scoring container 750 can then execute second code 756 stored in the second ML scoring container 750, providing the received output as an input parameter to the executable instructions in the second code 756. The second ML scoring container 750 further includes a model data file stored therein, which is read by the executable instructions in the second code 756 to determine values for the characteristics defining the machine learning model. Execution of the second code 756 results in a second output. The virtual machine instance 742 that initialized the second ML scoring container 750 can then transmit the second output to the model prediction data store 780 and/or the user device 702 via the frontend 749 (e.g., if no more trained machine learning models are needed to generate an output) or transmit the second output to a third ML scoring container 750 initialized in the same or different virtual machine instance 742 (e.g., if outputs from one or more additional trained machine learning models are needed), and the above-referenced process can be repeated with respect to the third ML scoring container 750.

While the virtual machine instances 742 are shown in FIG. 7 as a single grouping of virtual machine instances 742, some embodiments of the present application separate virtual machine instances 742 that are actively assigned to execute tasks from those virtual machine instances 742 that are not actively assigned to execute tasks. For example, those virtual machine instances 742 actively assigned to execute tasks are grouped into an "active pool," while those virtual machine instances 742 not actively assigned to execute tasks are placed within a "warming pool." In some embodiments, those virtual machine instances 742 within the warming pool can be pre-initialized with an operating system, language runtimes, and/or other software required to enable rapid execution of tasks (e.g., rapid initialization of ML scoring container(s) 750, rapid execution of code 756 in ML scoring container(s), etc.) in response to deployment and/or execution requests.

In some embodiments, the model hosting system 140 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (e.g., user devices 702, the model training system 120, etc.). The processing unit can also communicate to and from a memory of a virtual machine instance 742 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the operating environment supports many different types of machine learning models, such as multi-arm bandit models, reinforcement learning models, ensemble machine learning models, deep learning models, or the like.

The model training system 120 and the model hosting system 140 depicted in FIG. 7 are not meant to be limiting. For example, the model training system 120 and/or the model hosting system 140 could also operate within a computing environment having a fewer or greater number of devices than are illustrated in FIG. 7. Thus, the depiction of the model training system 120 and/or the model hosting system 140 in FIG. 7 may be taken as illustrative and not limiting to the present disclosure. For example, the model training system 120 and/or the model hosting system 140 or various constituents thereof could implement various Web services components, hosted or "cloud" computing environments, and/or peer-to-peer network configurations to implement at least a portion of the processes described herein. In some embodiments, the model training system 120 and/or the model hosting system 140 are implemented directly in hardware or software executed by hardware devices and may, for instance, include one or more physical or virtual servers implemented on physical computer hardware configured to execute computer-executable instructions for performing the various features that are described herein. The one or more servers can be geographically dispersed or geographically co-located, for instance, in one or more points of presence (POPs) or regional data centers.

The frontend processes all training requests received from user devices 702 and provisions virtual machine instances 722. In some embodiments, the frontend serves as a front door to all the other services provided by the model training system 120. The frontend processes the requests and makes sure that the requests are properly authorized. For example, the frontend may determine whether the user associated with the training request is authorized to initiate the training process.

Similarly, frontend 749 processes all deployment and execution requests received from user devices 702 and provisions virtual machine instances 742. In some embodiments, the frontend 749 serves as a front door to all the other services provided by the model hosting system 140. The frontend 749 processes the requests and makes sure that the requests are properly authorized. For example, the frontend 749 may determine whether the user associated with a deployment request or an execution request is authorized to access the indicated model data and/or to execute the indicated machine learning model.

The training data store 760 stores training data and/or evaluation data. The training data can be data used to train machine learning models and evaluation data can be data used to evaluate the performance of machine learning models. In some embodiments, the training data and the evaluation data have common data. In some embodiments, the training data and the evaluation data do not have common data. In some embodiments, the training data includes input data and expected outputs. While the training data store 760 is depicted as being located external to the model training system 120 and the model hosting system 140, this is not meant to be limiting. For example, in some embodiments not shown, the training data store 760 is located internal to at least one of the model training system 120 or the model hosting system 140.

In some embodiments, the training metrics data store 765 stores model metrics. While the training metrics data store 765 is depicted as being located external to the model training system 120 and the model hosting system 140, this is not meant to be limiting. For example, in some embodiments not shown, the training metrics data store 765 is located internal to at least one of the model training system 120 or the model hosting system 140.

The container data store 770 stores container images, such as container images used to form ML training containers 730 and/or ML scoring containers 750, that can be retrieved by various virtual machine instances 722 and/or 742. While the container data store 770 is depicted as being located external to the model training system 120 and the model hosting system 140, this is not meant to be limiting. For example, in some embodiments not shown, the container data store 770 is located internal to at least one of the model training system 120 and the model hosting system 140.

The training model data store 775 stores model data files. In some embodiments, some of the model data files are comprised of a single file, while other model data files are packages of multiple individual files. While the training model data store 775 is depicted as being located external to the model training system 120 and the model hosting system 140, this is not meant to be limiting. For example, in some embodiments not shown, the training model data store 775 is located internal to at least one of the model training system 120 or the model hosting system 140.

The model prediction data store 780 stores outputs (e.g., execution results) generated by the ML scoring containers 750 in some embodiments. While the model prediction data store 780 is depicted as being located external to the model training system 120 and the model hosting system 140, this is not meant to be limiting. For example, in some embodiments not shown, the model prediction data store 780 is located internal to at least one of the model training system 120 and the model hosting system 140.

While the model training system 120, the model hosting system 140, the training data store 760, the training metrics data store 765, the container data store 770, the training model data store 775, and the model prediction data store 780 are illustrated as separate components, this is not meant to be limiting. In some embodiments, any one or all of these components can be combined to perform the functionality described herein. For example, any one or all of these components can be implemented by a single computing device, or by multiple distinct computing devices, such as computer servers, logically or physically grouped together to collectively operate as a server system. Any one or all of these components can communicate via a shared internal network, and the collective system (e.g., also referred to herein as a machine learning service) can communicate with one or more of the user devices 702 via the one or more network(s) 106.

Various example user devices 702 are shown in FIG. 7, including a desktop computer, laptop, and a mobile phone, each provided by way of illustration. In general, the user devices 702 can be any computing device such as a desktop, laptop or tablet computer, personal computer, wearable computer, server, personal digital assistant (PDA), hybrid PDA/mobile phone, mobile phone, electronic book reader, set top box, voice command device, camera, digital media player, and the like. In some embodiments, the model training system 120 and/or the model hosting system 140 provides the user devices 702 with one or more user interfaces, command-line interfaces (CLI), application programming interfaces (API), and/or other programmatic interfaces for submitting training requests, deployment requests, and/or execution requests. In some embodiments, the user devices 702 can execute a stand-alone application that interacts with the model training system 120 and/or the model hosting system 140 for submitting training requests, deployment requests, and/or execution requests.

In some embodiments, the network 106 includes any wired network, wireless network, or combination thereof. For example, the network 106 may be a personal area network, local area network, wide area network, over-the-air broadcast network (e.g., for radio or television), cable network, satellite network, cellular telephone network, or combination thereof. As a further example, the network 106 may be a publicly accessible network of linked networks, possibly operated by various distinct parties, such as the Internet. In some embodiments, the network 106 may be a private or semi-private network, such as a corporate or university intranet. The network 106 may include one or more wireless networks, such as a Global System for Mobile Communications (GSM) network, a Code Division Multiple Access (CDMA) network, a Long Term Evolution (LTE) network, or any other type of wireless network. The network 106 can use protocols and components for communicating via the Internet or any of the other aforementioned types of networks. For example, the protocols used by the network 106 may include HTTP, HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Figure 8:
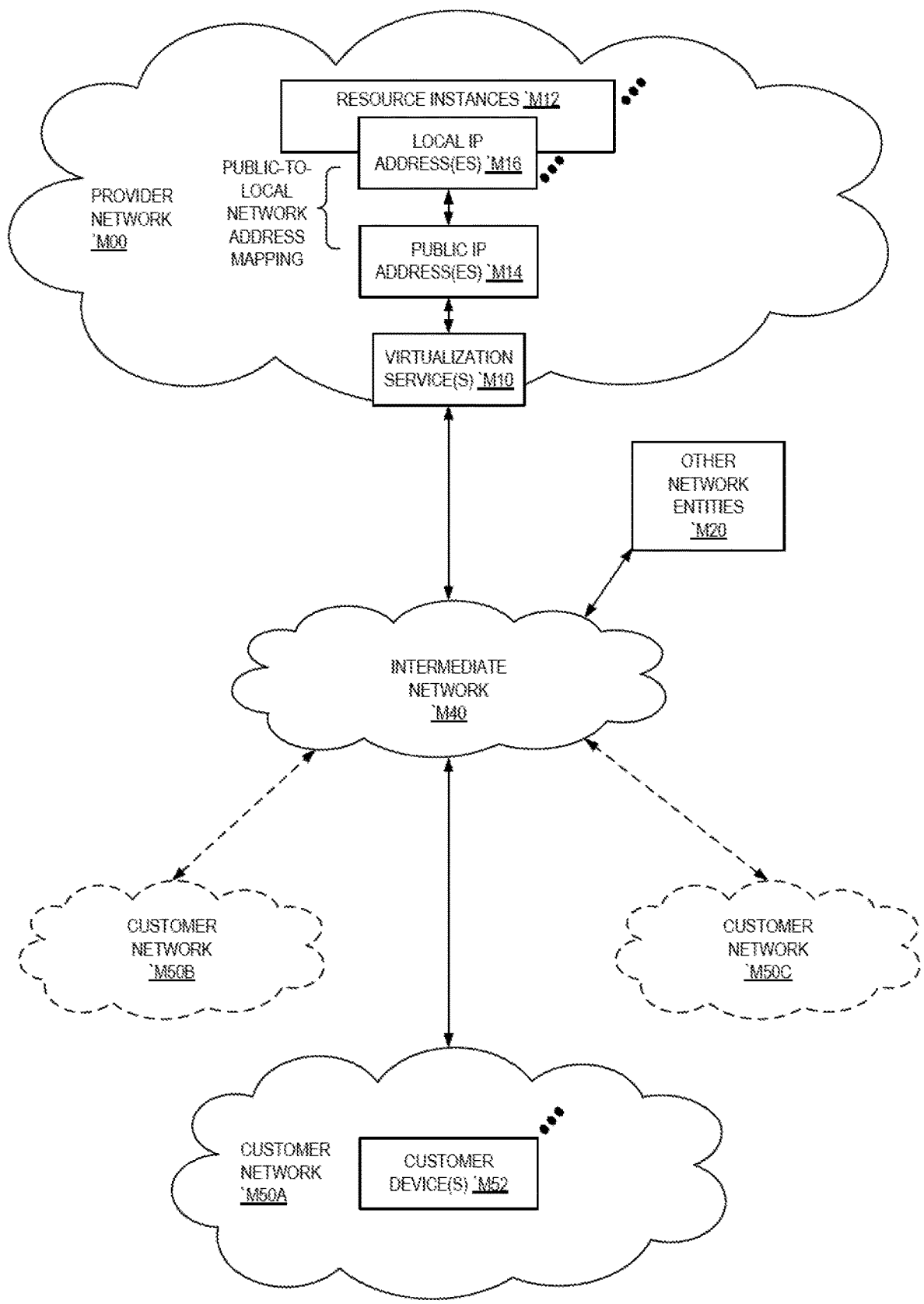
FIG. 8 illustrates an example provider network environment according to some embodiments.

FIG. 8 illustrates an example provider network (or "service provider system") environment according to some embodiments. A provider network 800 may provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 may be associated with the resource instances 812; the local IP addresses are the internal network addresses of the resource instances 812 on the provider network 800. In some embodiments, the provider network 800 may also provide public IP addresses 814 and/or public IP address ranges (e.g., Internet Protocol version 4 (IPv4) or Internet Protocol version 6 (IPv6) addresses) that customers may obtain from the provider 800.

Conventionally, the provider network 800, via the virtualization services 810, may allow a customer of the service provider (e.g., a customer that operates one or more client networks 850A-850C including one or more customer device(s) 852) to dynamically associate at least some public IP addresses 814 assigned or allocated to the customer with particular resource instances 812 assigned to the customer. The provider network 800 may also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of customer network(s) 850A-850C may, for example, implement customer-specific applications and present the customer's applications on an intermediate network 840, such as the Internet. Other network entities 820 on the intermediate network 840 may then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 may be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 800; a customer may then assign their allocated public IP addresses to particular resource instances allocated to the customer. These public IP addresses may be referred to as customer public IP addresses, or simply customer IP addresses. Instead of being assigned by the provider network 800 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
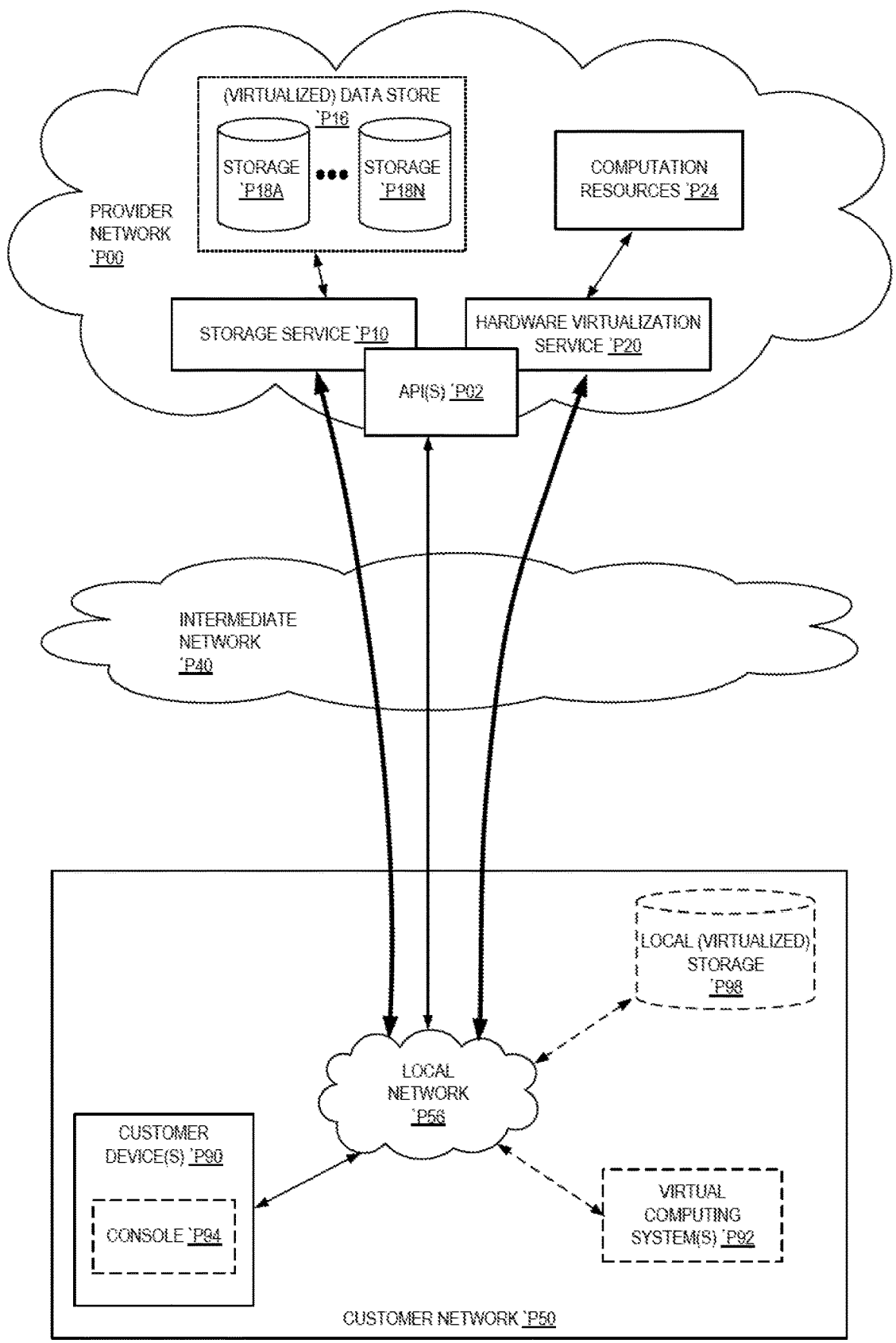
FIG. 9 is a block diagram of an example provider network that provides a storage service and a hardware virtualization service to customers according to some embodiments.

FIG. 9 is a block diagram of an example provider network that provides a storage service and a hardware virtualization service to customers, according to some embodiments. Hardware virtualization service 920 provides multiple computation resources 924 (e.g., VMs) to customers. The computation resources 924 may, for example, be rented or leased to customers of the provider network 900 (e.g., to a customer that implements customer network 950). Each computation resource 924 may be provided with one or more local IP addresses. Provider network 900 may be configured to route packets from the local IP addresses of the computation resources 924 to public Internet destinations, and from public Internet sources to the local IP addresses of computation resources 924.

Provider network 900 may provide a customer network 950, for example coupled to intermediate network 940 via local network 956, the ability to implement virtual computing systems 992 via hardware virtualization service 920 coupled to intermediate network 940 and to provider network 900. In some embodiments, hardware virtualization service 920 may provide one or more APIs 902, for example a web services interface, via which a customer network 950 may access functionality provided by the hardware virtualization service 920, for example via a console 994 (e.g., a web-based application, standalone application, mobile application, etc.). In some embodiments, at the provider network 900, each virtual computing system 992 at customer network 950 may correspond to a computation resource 924 that is leased, rented, or otherwise provided to customer network 950.

From an instance of a virtual computing system 992 and/or another customer device 990 (e.g., via console 994), the customer may access the functionality of storage service 910, for example via one or more APIs 902, to access data from and store data to storage resources 918A-918N of a virtual data store 916 (e.g., a folder or "bucket", a virtualized volume, a database, etc.) provided by the provider network 900. In some embodiments, a virtualized data store gateway (not shown) may be provided at the customer network 950 that may locally cache at least some data, for example frequently-accessed or critical data, and that may communicate with storage service 910 via one or more communications channels to upload new or modified data from a local cache so that the primary store of data (virtualized data store 916) is maintained. In some embodiments, a user, via a virtual computing system 992 and/or on another customer device 990, may mount and access virtual data store 916 volumes via storage service 910 acting as a storage virtualization service, and these volumes may appear to the user as local (virtualized) storage 998.

While not shown in FIG. 9, the virtualization service(s) may also be accessed from resource instances within the provider network 900 via API(s) 902. For example, a customer, appliance service provider, or other entity may access a virtualization service from within a respective virtual network on the provider network 900 via an API 902 to request allocation of one or more resource instances within the virtual network or within another virtual network.

Illustrative Systems

In some embodiments, a system that implements a portion or all of the techniques described herein may include a general-purpose computer system that includes or is configured to access one or more computer-accessible media, such as computer system 1000 illustrated in FIG. 10. In the illustrated embodiment, computer system 1000 includes one or more processors 1010 coupled to a system memory 1020 via an input/output (I/O) interface 1030. Computer system 1000 further includes a network interface 1040 coupled to I/O interface 1030. While FIG. 10 shows computer system 1000 as a single computing device, in various embodiments a computer system 1000 may include one computing device or any number of computing devices configured to work together as a single computer system 1000.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1010 may commonly, but not necessarily, implement the same ISA.

System memory 1020 may store instructions and data accessible by processor(s) 1010. In various embodiments, system memory 1020 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1020 as machine learning service code 1025 and data 1026.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices as illustrated in FIG.

1, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1000 includes one or more offload cards 1070 (including one or more processors 1075, and possibly including the one or more network interfaces 1040) that are connected using an I/O interface 1030 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1000 may act as a host electronic device (e.g., operating as part of a hardware virtualization service) that hosts compute instances, and the one or more offload cards 1070 execute a virtualization manager that can manage compute instances that execute on the host electronic device. As an example, in some embodiments the offload card(s) 1070 can perform compute instance management operations such as pausing and/or un-pausing compute instances, launching and/or terminating compute instances, performing memory transfer/copying operations, etc. These management operations may, in some embodiments, be performed by the offload card(s) 1070 in coordination with a hypervisor (e.g., upon a request from a hypervisor) that is executed by the other processors 1010A-1010N of the computer system 1000. However, in some embodiments the virtualization manager implemented by the offload card(s) 1070 can accommodate requests from other entities (e.g., from compute instances themselves), and may not coordinate with (or service) any separate hypervisor.

In some embodiments, system memory 1020 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 918A-918N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
    receiving, at an endpoint of a multi-tenant provider network, one or more messages indicating a request to train a machine learning (ML) model;
    initiating, by a model training system including memory storing model training system instructions and one or more processors for executing the model training system instructions, at least one training instance to train a machine learning (ML) model within a provider network using an iterative training process;
    obtaining, by a training monitor of the model training system during the iterative training process of the ML model by the at least one training instance, training data including resource utilization data associated with the iterative training process and model state data including current weights associated with portions of the ML model at a current iteration in the iterative training process;
    generating, by a ML analysis system separate from the model training system and based on the training data, including the resource utilization data associated with the iterative training process, and including the model state data including the current weights associated with portions of the ML model at the current iteration in the iterative training process, a plurality of feature importance metric values, each indicating a relative importance of a corresponding feature within the iterative training process, wherein the ML analysis system includes memory storing ML analysis system instructions and one or more processors for executing the ML analysis system instructions;
    determining, by the ML analysis system based at least in part on a first of the plurality of feature importance metric values that corresponds to a first feature of the plurality of features, that a modification condition is satisfied;
    causing the at least one training instance to modify a utilization or importance of the first feature in at least a subsequent iteration of the iterative training process, the modification affecting a numeric convergence of the training; and
    storing, at a conclusion of the iterative training process, one or more model artifacts for the ML model at a location of a storage service of the provider network.

2. The computer-implemented method of claim 1, wherein the causing the training instance to modify the utilization or importance of the first feature comprises eliminating the utilization of the first feature by setting all values of the first feature to a same value.

3. The computer-implemented method of claim 1, wherein the causing the training instance to modify the utilization or importance of the first feature comprises decreasing the importance of the first feature by decreasing a sampling rate corresponding to the first feature.

4. A computer-implemented method comprising:
  initiating, by a model training system including memory storing model training system instructions and one or more processors for executing the model training system instructions, at least one training instance to train a machine learning (ML) model within a provider network using an iterative training process;
  obtaining, by a training monitor of the model training system during the iterative training process of the ML model by the at least one training instance, training data including resource utilization data associated with the iterative training process and model state data including current weights associated with portions of the ML model at a current iteration in the iterative training process;
  generating, by a ML analysis system separate from the model training system and based on the training data, including the resource utilization data associated with the iterative training process, and including the model state data including the current weights associated with portions of the ML model at the current iteration in the iterative training process, a plurality of metric values corresponding to a plurality of features used in the iterative training process, wherein the ML analysis system includes memory storing ML analysis system instructions and one or more processors for executing the ML analysis system instructions;
  determining, by the ML analysis system based at least in part on a first of the plurality of metric values that corresponds to a first feature of the plurality of features, that a modification condition is satisfied; and
  causing the at least one training instance to modify a utilization or importance of the first feature in a subsequent iteration in the iterative training process.

5. The computer-implemented method of claim 4, wherein:
  determining that the modification condition is satisfied comprises determining that the first metric value is less than a first threshold amount; and
  causing the training instance to modify the utilization or importance of the first feature includes causing the training instance to no longer utilize original values of the first feature in the iterative training process.

6. The computer-implemented method of claim 5, wherein causing the training instance to no longer utilize the first feature in the iterative training process includes setting all values of the first feature in a training dataset to be a same value.

7. The computer-implemented method of claim 4, wherein:
  determining that the modification condition is satisfied comprises determining that the first metric value is greater than a second threshold amount; and
  causing the training instance to modify the utilization or importance of the first feature includes causing the training instance to reduce the importance of the first feature in the iterative training process.

8. The computer-implemented method of claim 7, wherein causing the training instance to reduce the impor-tance of the first feature includes modifying a sampling rate associated with values of the first feature.

9. The computer-implemented method of claim 4, further comprising:
  receiving a message originated by a computing device of a user that indicates a value; and
  setting the modification condition based at least in part on the value.

10. The computer-implemented method of claim 4, wherein each of the plurality of metric values indicates a relative importance of the corresponding feature within the iterative training process.

11. The computer-implemented method of claim 4, further comprising:
  transmitting a message to a computing device of a user, the message indicating a set of features to be used as input for the ML model, wherein the set of features does not include the first feature.

12. The computer-implemented method of claim 4, wherein causing the training instance to modify the utilization or importance of the first feature comprises one or more of:
  suppressing the first feature in the iterative training process, reducing or increasing an importance of the first feature in the iterative training process, modifying values in a training dataset of the first feature for the iterative training process, or modifying one or more training parameters associated with the iterative training process.

13. The computer-implemented method of claim 12, further comprising:
  deploying the ML model within the provider network behind an endpoint;
  receiving a request to perform inference using the ML model that was originated by a client that was directed to the endpoint;
  generating an inference using the ML model; and
  transmitting the inference to the client.

14. The computer-implemented method of claim 4, wherein causing the training instance to modify the utilization or importance of the first feature in the iterative training process comprises:
  modifying at least a metadata value associated with the first feature within a file provided by a filesystem, wherein the training instance reads the file at a conclusion of an iteration of the iterative training process and adjusts a subsequent iteration of the iterative training process based at least on the metadata value.

15. A system comprising:
  a model training system implemented by a first one or more electronic devices, the model training system to execute one or more training instances to train a machine learning (ML) model and a corresponding one or more training monitors to generate training metric values corresponding to ones of a plurality of features used during the training of the ML model, the model training system including memory storing model training system instructions that, upon execution by one or more processors of the model training system, cause the model training system to:
    initiate at least one training instance to train the ML model within a provider network using an iterative training process; and
    obtain, by a training monitor of the model training system during the iterative training process of the ML model by the at least one training instance, training data including resource utilization data associated with the iterative training process and model state data including current weights associated with portions of the ML model at a current iteration in the iterative training process; and a ML analysis system implemented by a second one or more electronic devices, the ML analysis system including memory storing ML analysis system instructions that, upon execution by one or more processors of the ML analysis system, cause the ML analysis system to:

generate, during the iterative training process of the ML model and based on the training data, including the resource utilization data associated with the iterative training process, and including the model state data including the current weights associated with portions of the ML model at the current iteration in the iterative training process, a plurality of metric values corresponding to the plurality of features used in the iterative training process;

determine, based at least in part on a first of the plurality of metric values that corresponds to a first feature of the plurality of features, that a modification condition is satisfied; and cause the one or more training instances to modify a utilization or importance of the first feature in a subsequent iteration of the iterative training process.

16. The system of claim 15, wherein:
to determine that the modification condition is satisfied, the ML analysis system instructions upon execution cause the ML analysis system to determine that the first metric value is less than a first threshold amount; and
to cause the one or more training instances to modify the utilization or importance of the first feature, the ML analysis system instructions upon execution cause the ML analysis system to cause the one or more training instances to no longer utilize original values of the first feature in the iterative training process.

17. The system of claim 15, wherein:
to determine that the modification condition is satisfied, the ML analysis system instructions upon execution cause the ML analysis system to determine that the first metric value is less than a second threshold amount; and
to cause the one or more training instances to modify the utilization or importance of the first feature, the ML analysis system instructions upon execution cause the ML analysis system to cause the one or more training instances to reduce the importance of the first feature in the iterative training process.

18. The system of claim 15, wherein to cause the one or more training instances to modify the utilization or importance of the first feature, the ML analysis system instructions upon execution cause the ML analysis system to either:
modify a sampling rate associated with values of the first feature; or
set all values of the first feature within a training dataset to be a same value.

19. The system of claim 15, wherein to cause the one or more training instances to modify the utilization or importance of the first feature in the iterative training process, the ML analysis system instructions upon execution cause the ML analysis system to:
send a message to the one or more monitoring instances to modify at least a metadata value associated with the first feature within a file provided by a filesystem, wherein the one or more training instances read the file at a conclusion of an iteration of the iterative training process and adjust a subsequent iteration of the iterative training process based at least on the metadata value.

20. The system of claim 15, wherein each of the plurality of metric values indicates a relative importance of the corresponding feature within the iterative training process.

* * * * *